United States Patent
Chen et al.

(10) Patent No.: US 9,398,284 B2
(45) Date of Patent: Jul. 19, 2016

(54) CONSTRUCTING REFERENCE PICTURE LISTS FOR MULTI-VIEW OR 3DV VIDEO CODING

(71) Applicant: QUALCOMM Incorporated, San Diego, CA (US)

(72) Inventors: Ying Chen, San Diego, CA (US); Li Zhang, San Diego, CA (US); Adarsh Krishnan Ramasubramonian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 279 days.

(21) Appl. No.: 13/968,140

(22) Filed: Aug. 15, 2013

(65) Prior Publication Data

US 2014/0049604 A1 Feb. 20, 2014

Related U.S. Application Data

(60) Provisional application No. 61/684,033, filed on Aug. 16, 2012, provisional application No. 61/750,710, filed on Jan. 9, 2013, provisional application No. 61/753,822, filed on Jan. 17, 2013.

(51) Int. Cl.
*H04N 19/00* (2014.01)
*H04N 13/00* (2006.01)
(Continued)

(52) U.S. Cl.
CPC ......... *H04N 13/0048* (2013.01); *H04N 19/597* (2014.11); *H04N 19/70* (2014.11)

(58) Field of Classification Search
CPC .. H04N 13/0048; H04N 19/597; H04N 19/70
USPC ...................................... 375/240.25
See application file for complete search history.

(56) References Cited

U.S. PATENT DOCUMENTS

| | | | |
|---|---|---|---|
| 7,756,206 B2 | 7/2010 | Ridge et al. | |
| 2008/0007438 A1* | 1/2008 | Segall | H04N 19/176 341/61 |

(Continued)

FOREIGN PATENT DOCUMENTS

| | | |
|---|---|---|
| WO | 2011074153 A1 | 6/2011 |
| WO | 2013033596 A1 | 3/2013 |

OTHER PUBLICATIONS

Anonymous: "Text of ISO/IEC IS 14496-10:201X (7th edition)", 98. MPEG Meeting;Nov. 28, 2011-Feb. 12, 2011 ; Geneva; (Motion Picture Expert Group or ISO/IEC JTC1/SC29/WG11),, No. N12363, Feb. 2, 2012, XP030018858.*

(Continued)

*Primary Examiner* — Jeffrey Williams
(74) *Attorney, Agent, or Firm* — Shumaker & Sieffert, P.A.

(57) ABSTRACT

In one example, a video coder, such as a video encoder or a video decoder, is configured to code a value for a layer identifier in a slice header for a current slice in a current layer of multi-layer video data, and, when the value for the layer identifier is not equal to zero, code a first set of syntax elements in accordance with a base video coding standard, and code a second set of one or more syntax elements in accordance with an extension to the base video coding standard. The second set of syntax elements may include a syntax element representative of a position for an identifier of an inter-layer reference picture of a reference layer in a reference picture list, and the video coder may construct the reference picture list such that the identifier of the inter-layer reference picture is located in the determined position.

25 Claims, 6 Drawing Sheets

(51) Int. Cl.
H04N 19/597 (2014.01)
H04N 19/70 (2014.01)

(56) References Cited

U.S. PATENT DOCUMENTS

| | | | |
|---|---|---|---|
| 2011/0096835 A1 | 4/2011 | Lim et al. | |
| 2013/0057646 A1 | 3/2013 | Chen et al. | |
| 2013/0070859 A1 | 3/2013 | Lu et al. | |
| 2013/0208792 A1* | 8/2013 | He | H04N 19/00569 375/240.12 |

OTHER PUBLICATIONS

"Text of ISO/IEC is 14496-10:201X (7th edition)," MPEG Meeting; Nov. 28-Dec. 2, 2011; Geneva; (Motion Picture Expert Group or ISO/IEC JTC1/SC29/WG11), No. N12363, XP030018858, 721 pp.
Bross et al., "High efficiency video coding (HEVC) text specification draft 10 (For FDIS & Last Call)," 12th Meeting: Geneva, CH, Jan. 14-23, 2013, JCTVC-L1003_v34, 310 pp.
Bross et al., "High efficiency video coding (HEVC) text specification draft 7," 9th Meeting: Geneva, CH, Apr. 27-May 7, 2012, JCTVC-I1003_d2, 290 pp.
Bross et al., "High efficiency video coding (HEVC) text specification draft 8," 10th Meeting: Stockholm, SE, Jul. 11-20, 2012, JCTVC-J1003_d7, 261 pp.
Bross et al., "High efficiency video coding (HEVC) text specification draft 6," 8th Meeting: San Jose, CA, USA, Feb. 1-10, 2012, JCTVC-H1003, 259 pp.
Bross et al., "High efficiency video coding (HEVC) text specification draft 9," 11th Meeting: Shanghai, CN, Oct. 10-19, 2012, JCTVC-K1003_v7, 290 pp.
Bross et al., "WD4: Working Draft 4 of High-Efficiency Video Coding," 6th Meeting: JCTVC-F803_d2, Torino, IT, Jul. 14-22, 2011, 226 pp.
Bross et al., "WD5: Working Draft 5 of High-Efficiency Video Coding," 7th Meeting: Geneva, Switzerland, Nov. 21-30, 2011, JCTVC-G1103_d2, 214 pp.
Chen, et al., "3D-HEVC HLS: reference picture list modification", MPEG Meeting; Apr. 30-May 4, 2012; Geneva; (Motion Picture Expert Group or ISO/IEC JTC1 /SC29/WG11 ), No. m24944, XP030053287, 9 pp.
Choi, et al., "3D-HEVC HLS: On Reference list", 100. MPEG Meeting; Apr. 30-May 4, 2012; Geneva; (Motion Picture Expert Group or ISO/IEC JTC1/SC29/WG11),, No. m24876, XP030053219, 8 pp.
Hannuksela, et al., "AHG21: Removal of reference picture list modification", MPEG Meeting; Feb. 6-10, 2012; San Josa CR; (Motion Picture Expert Group or ISO/IEC JTC1/SC29/WG11), No. m23302, XP030051827, 10 pp.
International Search Report and Written Opinion from International Application No. PCT/US2013/055403, dated Feb. 19, 2014, 19 pp.
ITU-T H.264, Series H: Audiovisual and Multimedia Systems, Infrastructure of audiovisual serivces—Coding of moving video, Advanced video coding for generic audiovisual services, The International Telecommunication Union. Jun. 2011, 674 pp.
Partial International Search Report from International Application No. PCT/US2013/055403, dated Nov. 11, 2013, 7 pp.
Ramasubramonian, et al., "AHG7: Inter-layer reference pictures in reference picture list initialization", JCT-3V Meeting; Apr. 20, 2013-Apr. 26, 2013; Incheon; (The Joint Collaborative Team on 3D Video Coding Extension Development of ISO/IEC JTC1/SC29/WG11 and ITU-T SG.16 ); URL: http://phenix.int-evry.fr/jct2/, No. JCT3V-D0198, 4 pp.
Ramasubramonian, et al., "AHG7: Reference picture list initialization for MV-HEVC", JCT-3V Meeting; 103. MPEG Meeting; Jan. 17-23, 2013; Geneva; (The Joint Collaborative Team on 3D Video Coding Extension Development of ISO/IEC JTC1/SC29/WG11 and ITU-T SG.16); URL: http://phenix.int-evry.fr/jct2/, No. JCT3V-C0060, XP030130476, 3 pp.
Wiegand et al., "WD1: Working Draft 1 of High-Efficiency Video Coding", JCTVC-C403, 3rd Meeting: Guangzhou, CN, Oct. 7-15, 2010, 137 pp.
Wiegand et al., "WD2: Working Draft 2 of High-Efficiency Video Coding," JCTVC-D503, 4th Meeting: Daegu, KR, Jan. 20-28, 2011, 153 pp.
Wiegand et al., "WD3: Working Draft 3 of High-Efficiency Video Coding," Document JCTVC-E603, 5th Meeting: Geneva, CH, Mar. 16-23, 2011, 193 pp.
Xiu, et al., "Inter-layer motion field mapping for the scalable extension of HEVC," Proceedings of SPIE-IS&T Electronic Imaging, vol. 8666, Feb. 21, 2013, XP055107231, ISSN: 0277-786X, DOI: 10.1117/12.2009230, pp. 866604-1 to 866604-7.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
Second Written Opinion from International Application No. PCT/US2013/055403, dated Sep. 22, 2014, 9 pp.
International Preliminary Report on Patentability from International Application No. PCT/US2013/055403, dated Nov. 14, 2014, 28 pp.

* cited by examiner

CONSTRUCTING REFERENCE PICTURE LISTS FOR MULTI-VIEW OR 3DV VIDEO CODING

This application claims the benefit of U.S. Provisional Application Ser. No. 61/684,033, filed Aug. 16, 2012, U.S. Provisional Application Ser. No. 61/750,710, filed Jan. 9, 2013, and U.S. Provisional Application Ser. No. 61/753,822, filed Jan. 17, 2013, each of which is hereby incorporated by reference in its respective entirety.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques for coding syntax elements of slice headers based at least in part on a video coding paradigm used to code slices including the slice headers. For example, the syntax elements may include values related to constructing reference picture lists, e.g., for inter-view reference pictures for three-dimensional (3D) video coding. To provide video data used for 3D video effects, two or more images of a scene may be played simultaneously or substantially simultaneously, where the images correspond to different "views" of the scene, that is, different horizontal camera perspectives. Multiview video coding techniques include techniques for coding these images, e.g., using inter-view prediction. In order to refer to an inter-view reference picture during coding, video coders may use an index into a reference picture list. Video encoders and video decoders may be configured, in accordance with the techniques of this disclosure, to initialize and construct reference picture lists, such that a coded index value represents the correct reference picture in the reference picture list. That is, certain syntax elements may be provided having values representative of how to construct and/or modify a reference picture list that are particular to an extension to a base video coding standard when a layer identifier indicates that a slice is included in a layer that is coded according to the extension to the base video coding standard.

In one example, a method of decoding video data includes decoding a value for a layer identifier in a slice header for a current slice in a current layer of multi-layer video data, and, when the value for the layer identifier is not equal to zero: decoding a first set of syntax elements in accordance with a base video coding standard, and decoding a second set of one or more syntax elements in accordance with an extension to the base video coding standard.

In another example, a method of encoding video data includes encoding video data of a current slice in accordance with a base video coding standard when the current slice forms part of a base layer of multi-layer video data, and encoding the video data of the current slice in accordance with an extension to the base video coding standard when the current slice forms part of a non-base layer of the multi-layer video data, encoding a value for a layer identifier in a slice header for the current slice, wherein the value for the layer identifier indicates whether the current slice forms part of the base layer or the non-base layer, and, when the current slice forms part of the non-base layer: encoding a first set of syntax elements in accordance with the base video coding standard, and encoding a second set of one or more syntax elements in accordance with the extension to the base video coding standard.

In another example, a device for coding video data includes a video coder configured to code a value for a layer identifier in a slice header for a current slice in a current layer of multi-layer video data, and, when the value for the layer identifier is not equal to zero, code a first set of syntax elements in accordance with a base video coding standard, and code a second set of one or more syntax elements in accordance with an extension to the base video coding standard.

In another example, a device for coding video data includes means for coding a value for a layer identifier in a slice header for a current slice in a current layer of multi-layer video data, means for coding a first set of syntax elements in accordance with a base video coding standard when the value for the layer identifier is not equal to zero, and means for coding a second set of one or more syntax elements in accordance with an extension to the base video coding standard when the value for the layer identifier is not equal to zero.

In another example, a computer-readable storage medium has stored thereon instructions that, when executed, cause a processor to code a value for a layer identifier in a slice header for a current slice in a current layer of multi-layer video data, and, when the value for the layer identifier is not equal to zero: code a first set of syntax elements in accordance with a base video coding standard, and code a second set of one or more syntax elements in accordance with an extension to the base video coding standard.

In another example, a method of coding video data includes determining, for construction of a reference picture list for a current slice of a current view, a position for an identifier of an inter-view reference picture of a reference view, constructing the reference picture list such that the identifier of the inter-view reference picture is located in the determined position of the reference picture list, coding an index value corresponding to the determined position for a portion of the current slice, and coding the portion of the current slice using the inter-view reference picture based on the index value.

In another example, a video coding device includes a video coder, such as a video encoder or a video decoder, configured to determine, for construction of a reference picture list for a current slice of a current view, a position for an identifier of an inter-view reference picture of a reference view, construct the reference picture list such that the identifier of the inter-view reference picture is located in the determined position of the reference picture list, code an index value corresponding to the determined position for a portion of the current slice, and code the portion of the current slice using the inter-view reference picture based on the index value.

In another example, a video coding device includes means for determining, for construction of a reference picture list for a current slice of a current view, a position for an identifier of an inter-view reference picture of a reference view, means for constructing the reference picture list such that the identifier of the inter-view reference picture is located in the determined position of the reference picture list, means for coding an index value corresponding to the determined position for a portion of the current slice, and means for coding the portion of the current slice using the inter-view reference picture based on the index value.

In another example, a computer-readable storage medium has stored thereon instructions that, when executed, cause a processor to determine, for construction of a reference picture list for a current slice of a current view, a position for an identifier of an inter-view reference picture of a reference view, construct the reference picture list such that the identifier of the inter-view reference picture is located in the determined position of the reference picture list, code an index value corresponding to the determined position for a portion of the current slice, and code the portion of the current slice using the inter-view reference picture based on the index value.

The details of one or more examples are set forth in the accompanying drawings and the description below. Other features, objects, and advantages will be apparent from the description and drawings, and from the claims.

DETAILED DESCRIPTION

Figure 1:
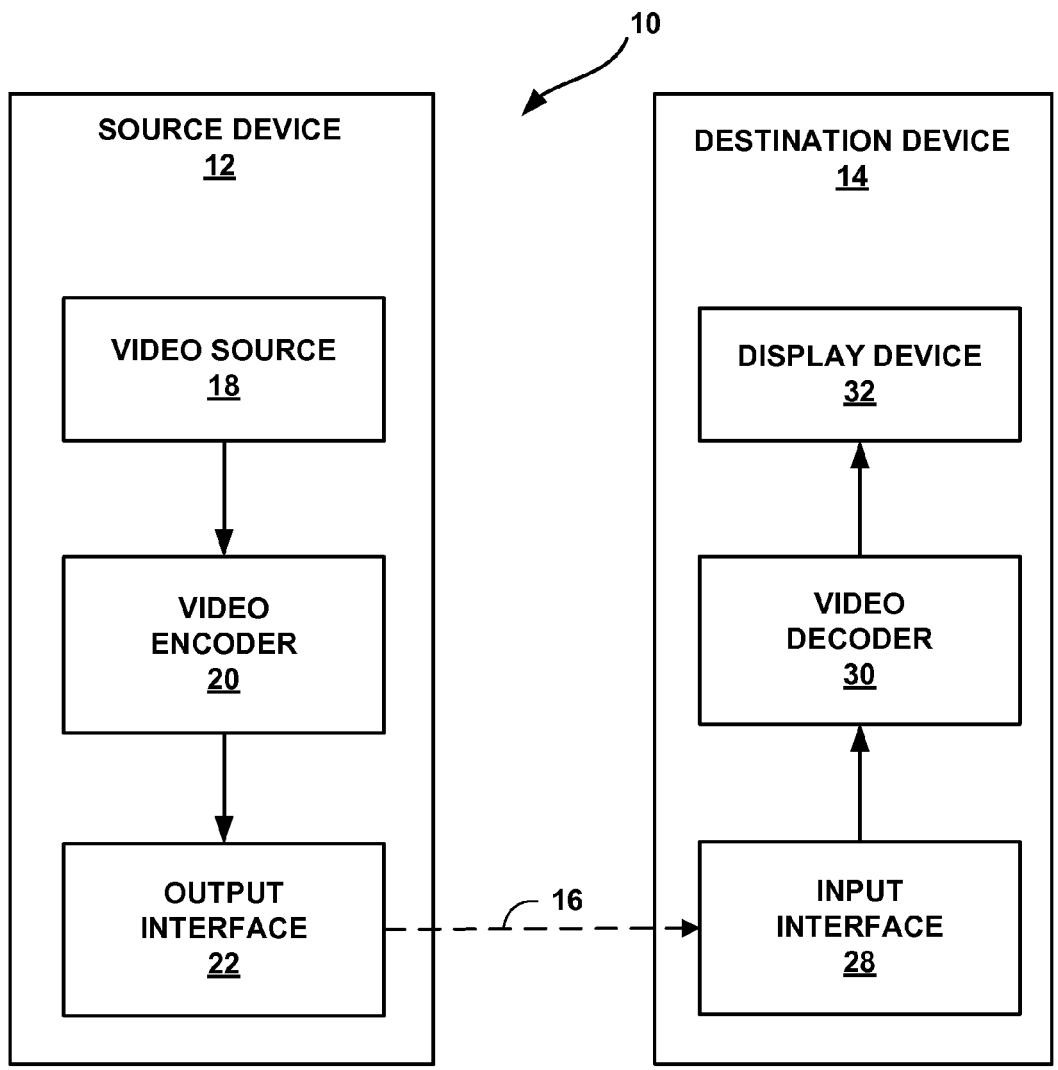
FIG. 1 is a block diagram illustrating an example video encoding and decoding system that may utilize techniques for constructing reference picture lists.

In general, the techniques of this disclosure are directed to coding of syntax elements based at least in part on whether a slice is included in a layer that is coded according to a base video coding standard or in a layer that is coded according to an extension of the base video coding standard. For instance, the base video coding standard may correspond to High Efficiency Video Coding (HEVC), and the extension may correspond to multiview HEVC (MV-HEVC), three-dimensional HEVC (3D-HEVC), or scalable HEVC (S-HEVC) extensions. Different layers (e.g., scalable layers or views) may be coded according to different types of coding paradigms. For instance, a base layer may be coded according to a base video coding standard, such as HEVC, and an enhancement layer (or dependent view) may be coded according to an extension of the base video coding standard, such as MV-HEVC, 3D-HEVC, or S-HEVC.

Syntax elements for slices in the base layer may conform to the base video coding standard (that is, include syntax elements conforming to the base video coding standard), whereas syntax elements for slices in the enhancement layer (or dependent view) may include both syntax elements conforming to the base video coding standard and syntax elements conforming to the extension of the video coding standard, assuming the enhancement layer is coded using the extension. As one example, syntax elements added for an extension to a base video coding standard may include reference picture list construction and/or modification syntax elements, as discussed in greater detail below.

Video coding (e.g., encoding or decoding) generally involves coding a series of pictures by taking advantage of redundancies in the pictures, whether spatial redundancies or temporal redundancies. Spatial redundancies can be exploited using intra-prediction, whereby blocks of a current picture may be predicted relative to pixels of neighboring, previously coded blocks. Temporal redundancies can be exploited using inter-prediction, whereby blocks of a current picture may be predicted relative to pixels of previously coded pictures.

The series of pictures may be captured or generated in a certain order, which may be substantially similar to (or identical to) the order in which the pictures are to be displayed. However, the order in which the series of pictures are coded (encoded or decoded) is not necessarily the same as the order in which the pictures are captured, generated, or displayed (generally referred to as the display order). This allows some pictures (e.g., B-pictures) to be coded with reference to both a temporally earlier picture and a temporally later picture, which may yield predicted values that are very close to the actual values of the current picture being coded.

Thus, for inter-prediction of a current picture, video coders (such as video encoders and video decoders) may generate various reference picture lists. For example, List 0 may include reference pictures having a display order that is earlier than the current picture being coded, while List 1 may include reference pictures have a display order that is later than the current picture being coded. In this manner, reference pictures to be used when coding the current picture (or a slice thereof) may be identified using an index value into one of the reference picture lists (e.g., List 0 and List 1).

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. In addition, there is a new video coding standard, namely High-Efficiency Video Coding (HEVC), being developed by the Joint Collaboration Team on Video Coding (JCT-VC) of ITU-T Video Coding Experts Group (VCEG) and ISO/IEC Motion Picture Experts Group (MPEG). The latest Working Draft (WD) of HEVC, and referred to as HEVC WD8 or, simply, WD8. WD8 is described in Bross et al., "High Efficiency Video Coding (HEVC) Text Specification Draft 8," document JCTVC-J1003_d7, Joint Collaborative Team on Video Coding (JCT-VC) of ITU-T SG16 WP3 and ISO/IEC JTC1/SC29/WG11, 10$^{th}$ Meeting: Stockholm, SE, Jul. 11-20, 2012, which as of Aug. 14, 2013, is available from http://phenix.int-evry.fr/jct/doc_end_user/documents/10_Stockholm/wg11/JCTVC-J1003-v8.zip.

In some instances, video data includes multiple layers. For instance, in scalable video coding for HEVC (S-HEVC), there may be a base layer and one or more enhancement layers, which may include data for enhancing pictures of the base layer. As an example, the base layer pictures may have a relatively low spatial resolution, and the enhancement layer(s) may include data for increasing the spatial resolution of the base layer (and/or lower enhancement layers). Enhancement layers may enhance the base layer in one or more dimensions, such as spatial resolution, signal-to-noise ratio (SNR) quality levels, bit depths, or the like.

Additionally or alternatively, in multi-view video coding for HEVC (e.g., MV-HEVC or 3D-HEVC), there may be a base view and one or more dependent views, where each view may correspond to a different camera perspective of a scene, e.g., for rendering three-dimensional video data. The dependent views may be inter-view coded with respect to the base view (or to a non-base view that is lower in the view hierarchy). Hence, each view can be considered a respective layer of video data.

This disclosure recognizes that HEVC may be further extended in the future. S-HEVC, MV-HEVC, and 3D-HEVC are upcoming extensions to HEVC, and other extensions may be added in the future. Typically, extensions to video standards include additional signaling data. This disclosure proposes various techniques related to extending HEVC, e.g., for multi-layer coding (which may include multi-view coding).

As one example, this disclosure proposes coding a base layer in accordance with the HEVC base specification. In this manner, signaled data for video data in the base layer need not be changed with respect to the HEVC base specification. A base layer may be defined as a layer for which a layer identifier (layer_id) has a value of zero. Thus, additional data may be signaled only for non-base layers, e.g., layers for which a layer identifier has a non-zero value.

As discussed above, block-based video coding generally includes prediction of blocks of video data, which may be performed using intra-prediction or inter-prediction. To code a block using inter-prediction, a video coder constructs a reference picture list, including potential reference pictures for a slice including the block. Then, the video coder codes data for the block representative of an index into the reference picture list, where the index corresponds to the actual reference picture that is used to predict the block. In this manner, it is important that both video encoders and video decoders construct the reference picture list in the same way.

Construction of a reference picture list may include constructing a temporary reference picture list according to default construction rules from one or more subsets of a reference picture set (where each subset may be referred to as an "RPS subset"). The video coder may then rearrange the temporary reference picture list. A video encoder may determine an appropriate manner in which to rearrange the temporary reference picture list, and a video decoder may use signaled data to determine how to rearrange the temporary reference picture list. Video coders also typically construct up to two reference picture lists per slice: list 0 and list 1. Thus, video coders construct up to two temporary reference picture lists. A reference picture list may be referred to as RefPicListX, and the temporary reference picture list for RefPicListX may be referred to as RefPicListTempX, where X is equal to 0 or 1.

In accordance with HEVC WD8, video coders may perform reference picture list initialization to create default List 0 and List 1 (if the slice is a B slice) based on three reference picture set (RPS) subsets: RefPicSetStCurrBefore, RefPicSetStCurrAfter, and RefPicSetLtCurr. Short-term reference pictures with earlier (later) output order to the current picture may first be inserted into the List 0 (List 1) in ascending order of picture order count (POC) distance, then short-term reference pictures with later (earlier) output order to the current picture may be inserted into the List 0 (List 1) in ascending order of POC distance, and finally the long-term reference pictures may be inserted at the end.

In terms of RPS, for List 0, the entries in RefPicSetStCurrBefore may be inserted in the initial list, followed by the entries in RefPicSetStCurrAfter. Afterwards, the entries in RefPicSetLtCurr, if available, may be appended. In HEVC, the above process is repeated (reference pictures that have already been added to the reference picture list are added again) when the number of entries in a list is smaller than the target number of active reference pictures (signaled in a picture parameter set (PPS) or slice header). When the number of entries is larger than the target number, HEVC WD8 specifies that the list is to be truncated.

After a reference picture list has been initialized, it may be modified such that the reference pictures for the current picture may be arranged in any order, including the case where one particular reference picture may appear in more than one position in the list, based on the reference picture list modification commands. When a flag that indicates if modifications are present or not is set to one, a fixed number (equal to the target number of entries in the reference picture list) of commands are signaled, and each command inserts one entry for a reference picture list. A reference picture may be identified in the command by the index to the list of reference pictures for the current picture derived from the RPS signaling.

Table 1 below provides syntax for a reference picture list modification data structure:

TABLE 1

| ref_pic_list_modification( ) { | Descriptor |
|---|---|
|   ref_pic_list_modification_flag_l0 | u(1) |
|   if( ref_pic_list_modification_flag_l0 && NumPocTotalCurr > 1 ) | |
|     for( i = 0; i <= num_ref_idx_l0_active_minus1; i++ ) | |
|       list_entry_l0[ i ] | u(v) |
|   if( slice_type = = B ) { | |
|     ref_pic_list_modification_flag_l1 | u(1) |
|     if( ref_pic_list_modification_flag_l1 && NumPocTotalCurr > 1 ) | |
|       for( i = 0; i <= num_ref_idx_l1_active_minus1; i++ ) | |
|         list_entry_l1[ i ] | u(v) |
|   } | |
| } | |

The variable NumPocTotalCurr of Table 1 may be set equal to NumPocStCurrBefore+NumPocStCurrAfter+NumPocLtCurr. List_entry_1X[i] (with X equal to 0 or 1) of Table 1 may specify the index of the reference picture in RefPicSetCurrTempListX to be placed at the current position of reference picture list LX (with X being 0 or 1). The length of the list_entry_1X[i] syntax element may be defined as Ceil(Log 2(NumPocTotalCurr)) bits. The value of list_entry_1X[i] may be in the range of 0 to NumPocTotalCurr−1, inclusive. If the syntax element list_entry_1X[i] is not present, it may be inferred to be equal to 0. In this manner, Table 1 provides syntax elements that may be used to modify an initialized list.

Video coders may be configured, in accordance with the techniques of HEVC WD8, to use the syntax elements of Table 1 to modify a reference picture list, as follows. The following process may be invoked when coding a P or B slice. The video coder may set variable NumRpsCurrTempList0 equal to Max(num_ref_idx_l0_active_minus1+1, NumPocTotalCurr) and construct the list RefPicListTemp0 as follows (where "#-#" refers to a corresponding portion of HEVC WD8):

```
rIdx = 0
while( rIdx < NumRpsCurrTempList0 ) {
    for( i = 0; i < NumPocStCurrBefore && rIdx <
        NumRpsCurrTempList0; rIdx++, i++ )
        RefPicListTemp0[ rIdx ] = RefPicSetStCurrBefore[ i ]
    for( i = 0; i < NumPocStCurrAfter && rIdx <
        NumRpsCurrTempList0; rIdx++, i++ )                      (8-8)
        RefPicListTemp0[ rIdx ] = RefPicSetStCurrAfter[ i ]
    for( i = 0; i < NumPocLtCurr && rIdx <
        NumRpsCurrTempList0; rIdx++, i++ )
        RefPicListTemp0[ rIdx ] = RefPicSetLtCurr[ i ]
}
```

The video coder may then construct list RefPicList0 as follows:

```
for( rIdx = 0; rIdx ≤ num_ref_idx_l0_active_minus1;             (8-9)
    rIdx++)
    RefPicList0[ rIdx ] =
        ref_pic_list_modification_flag_l0 ?
            RefPicListTemp0[list_entry_l0[rIdx]] :
            RefPicListTemp0[rIdx]
```

Where the formula structure "COND ? X:Y" evaluates the value of COND, and if COND is true, returns X, otherwise (if COND is false), returns Y.

When the slice is a B slice, the variable NumRpsCurrTempList1 may be set equal to Max(num_refidx_l1_active_minus1+1, NumPocTotalCurr) and the video coder may construct the list RefPicListTemp1 as follows:

```
rIdx = 0
while( rIdx < NumRpsCurrTempList1 ) {
    for( i = 0; i < NumPocStCurrAfter && rIdx <
        NumRpsCurrTempList1; rIdx++, i++ )
        RefPicListTemp1[ rIdx ] = RefPicSetStCurrAfter[ i ]
    for( i = 0; i < NumPocStCurrBefore && rIdx <
        NumRpsCurrTempList1; rIdx++, i++ )                      (8-10)
        RefPicListTemp1[ rIdx ] = RefPicSetStCurrBefore[ i ]
    for( i = 0; i < NumPocLtCurr && rIdx <
        NumRpsCurrTempList1; rIdx++, i++ )
        RefPicListTemp1[ rIdx ] = RefPicSetLtCurr[ i ]
}
```

The video coder may then construct RefPicList1, assuming the slice is a B-slice, as follows:

```
for( rIdx = 0; rIdx ≤ num_ref_idx_l1_active_minus1;             (8-11)
    rIdx++)
    RefPicList1[ rIdx ] =
        ref_pic_list_modification_flag_l1 ?
            RefPicListTemp1[list_entry_l1[rIdx]] :
            RefPicListTemp1[rIdx]
```

Video coding standards may be extended to support various other types of video data. For instance, a stereo/multiview extension of HEVC is being standardized under JCT-3V, without consideration of depth information. The reference picture lists of a view component in an enhancement view may be either explicitly signaled or signaled in a manner similar to the MVC extension of ITU-T H.264/AVC (also referred to as H.264/MVC or MVC). When similar to H.264/MVC, the inter-view references are added after temporal reference pictures during the initialization, such that the RefPicListTempX (with X being 0 or 1) contains the inter-view reference pictures following all the temporal reference pictures. Once the RefPicListTempX is created, the reordering/modification of the reference picture can be done purely based on the RefPicListTempX, without the need to know whether an entry inside it is an inter-view reference or not.

To support multi-layer video coding (e.g., inter-layer or inter-view prediction), a video coder may need to be configured to insert inter-layer (which again may include inter-view) reference pictures into the reference picture list at a particular position. In certain extensions, it may be advantageous to add the inter-layer reference pictures at one position, and in other extensions, it may be advantageous to add the inter-layer reference pictures at a different position. Thus, one example of the additional signaling data is data that signals the position at which inter-layer reference pictures are to be inserted into a reference picture list.

For instance, in one example, data may be signaled (e.g., in a slice header, a picture parameter set (PPS), or a sequence parameter set (SPS)) that indicates the default position at which inter-layer reference pictures are inserted into an initial reference picture list. It should be understood that this data would only be signaled for a non-base layer. In some examples, in addition, construction of the initial reference picture list may be changed based on the signaled data. Alternatively, data signaled to rearrange the initial reference picture list may be changed.

In another example, data may be signaled for a non-base layer that indicates whether inter-layer reference pictures are to be inserted at the beginning of an initial reference picture list for list 0, after temporal reference pictures having picture order count (POC) values smaller than the POC value of the current picture in list 0, after temporal reference pictures having POC values larger than the POC value for the current picture in list 0, or after long-term reference pictures (if any) in list 0. Similar data may be signaled for list 1. The positions in list 0 may be different than the position in list 1, as indicated by the data signaled for list 0 and list 1.

A possible reference picture list initialization process, when coding a P or B slice, is as follows. The variable NumRpsCurrTempList0 may be set equal to Max (num_ref_idx_l0_active_minus1+1, NumPocTotalCurr) and the video coder may construct list RefPicListTemp0 as follows:

```
cIdx = 0
while( cIdx < NumRpsCurrTempList0 ) {
    for( i = 0; i < NumPocStCurrBefore && cIdx <
        NumRpsCurrTempList0; cIdx++, i++ )
        RefPicListTemp0[ cIdx ] =
        RefPicSetStCurrBefore[ i ]
    for( i = 0; i < NumPocStCurrAfter && cIdx <
        NumRpsCurrTempList0; cIdx++, i++ )             (F-25)
        RefPicListTemp0[ cIdx ] = RefPicSetStCurrAfter[ i ]
    for( i = 0; i < NumPocLtCurr && cIdx <
        NumRpsCurrTempList0; cIdx++, i++ )
        RefPicListTemp0[ cIdx ] = RefPicSetLtCurr[ i ]
    for( i = 0; i < NumPocIvCurr && cIdx <
        NumRpsCurrTempList0; cIdx++, i++ )
        RefPicListTemp0[ cIdx ] = RefPicSetIvCurr[ i ]
```

The video coder may then construct list RefPicList0 as follows:

```
for( cIdx = 0; cIdX ≤ num_ref_idx_l0_active_minus1;     (F-26)
    RefPicList0[ cIdx ] =
    ref_pic_list_modification_flag_l0 ?
        RefPicListTemp0[list_entry_l0[cIdx]] :
        RefPicListTemp0[cIdx]
```

When the slice is a B slice, the video coder may set variable NumRpsCurrTempList1 equal to Max (num_ref_idx_l1_active_minus1+1, NumPocTotalCurr) and construct list RefPicListTemp1 as follows:

```
cIdx = 0
while( cIdx < NumRpsCurrTempList1 ) {
    for( i = 0; i < NumPocStCurrAfter && cIdx <
        NumRpsCurrTempList1; cIdx++, i++ )
        RefPicListTemp1[ cIdx ] = RefPicSetStCurrAfter[ i ]
```

-continued

```
    for( i = 0; i < NumPocStCurrBefore && cIdx <
        NumRpsCurrTempList1; cIdx++, i++ )             (F-27)
        RefPicListTemp1[ cIdx ] = RefPicSetStCurrBefore[ i ]
    for( i = 0; i < NumPocLtCurr && cIdx <
        NumRpsCurrTempList1; cIdx++, i++ )
        RefPicListTemp1[ cIdx ] = RefPicSetLtCurr[ i ]
    for( i = 0; i < NumPocIvCurr && cIdx <
        NumRpsCurrTempList1; cIdx++, i++ )
        RefPicListTemp1[ cIdx ] = RefPicSetIvCurr[ i ]
}
```

When the slice is a B-slice, the video coder may construct RefPicList1 as follows:

```
for( cIdx = 0; cIdX ≤ num_ref_idx_l1_active_minus1;    (F-28)
    cIdx++)
    RefPicList0[ cIdx ] =
    ref_pic_list_modification_flag_l1 ?
        RefPicListTemp1[list_entry_l1[cIdx]] :
        RefPicListTemp1[cIdx]
```

The video coder may set the variable NumPocTotalCurr equal to NumPocStCurrBefore+NumPocStCurrAfter+NumPocLtCurr+NumPocIvCurr. RePIcSetIvCurr refers to the RPS subset of the inter-view reference pictures, and NumPocIvCurr refers to the number of inter-view reference pictures.

The current design of reference picture list construction and modification may suffer from certain problems. For example, in many scenarios, the inter-view reference picture does not follow all of the temporal reference pictures, and not even all the entries in RefPicSetStCurrBefore for RefPicList0. When this happens, a full loop of reference picture list modification may be needed, which may cost many bits. There might also be cases where an inter-view reference picture is put at the end of a reference picture list, which does not require reference picture list modification. This disclosure describes techniques that may be used to overcome these and/or other problems associated with the current techniques of HEVC.

Video coders may be configured to initialize and/or modify reference picture lists in accordance with various techniques of this disclosure. These techniques may be used alone or in any combination. In one example, video coders may code a value in a slice header representative of a default position of inter-view references in an initial reference picture list, with inter-view reference pictures being present consecutively in the reference picture list. In another example, which may be in addition to the previous example, a temporal list RefPicListTempX, as a union of RPS subsets in a certain order, may be changed based on the signaled position of the inter-view reference pictures. Alternatively, the RefPicListTempX need not be changed, but instead, the initial list may be changed.

In another example, video coders may code a value in a slice header, picture parameter set (PPS), or sequence parameter set (SPS), indicative of whether inter-view reference pictures are placed at the beginning of an initial reference picture list 0 (RefPicList0) of a slice, right after (that is, immediately after) temporal reference pictures with smaller POC values than the current POC value for RefPicList0, right after the temporal reference pictures with larger POC values than the current POC for RefPicList0, or right after the long-term reference pictures, if present. In addition, video coders may code in the slice header, PPS, or SPS, whether the inter-view references are put at the beginning of the initial reference picture list 1 (RefPicList1) of a slice, right after the temporal reference pictures with larger POC values than the current POC for RefPicList1, right after the temporal reference pictures with smaller POC values than the current POC for RefPicList1, or right after the long-term reference pictures, if present.

To add new syntax elements for extensions to video coding standards, such as HEVC extensions, video coders may code such syntax elements as added under the condition of layer_id (reserved_zero_6 bits) not equal to 0. Thus, these syntax elements can be present and interleaved with the syntax elements already defined by a base video coding standard, such as the HEVC base specification.

FIG. 1 is a block diagram illustrating an example video encoding and decoding system 10 that may utilize techniques for constructing reference picture lists. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for constructing reference picture lists. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for constructing reference picture lists may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard presently under development, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video coding standards include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work on extensions to H.264/MPEG-4 AVC.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive treeblocks in coding order. A video frame or picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

In accordance with the techniques of this disclosure, a video coder (e.g., video encoder 20 or video decoder 30) may be configured to utilize different sets of syntax elements for a slice header of a slice based on whether the slice is in a base layer or in an enhancement layer. That is, assuming that video data of the base layer is coded according to a base video coding standard (e.g., HEVC) and that video data of the enhancement layer is coded according to an extension of the base video coding standard (e.g., MV-HEVC, 3D-HEVC, S-HEVC, or the like), additional syntax elements may be provided in slice headers of slices in the enhancement layer, relative to syntax elements in slice headers of slices in the base layer. Thus, the video coder may be configured to utilize a first set of syntax elements for slice headers of slices based on whether the slices are in a base layer or in an enhancement layer.

Video encoder 20 and video decoder 30 may be configured to code a layer identifier in a slice header for a slice, where the layer identifier (e.g., layer_id) has a value representative of the layer in which the slice is present. In particular, video encoder 20 may determine whether video data is being coded for a base layer or an enhancement layer, and encode a value for the layer identifier accordingly. Video decoder 30, on the other hand, may be configured to determine whether a slice is part of a base layer or an enhancement layer based on a decoded value for the layer identifier. A value of zero for the layer identifier generally indicates that the corresponding layer is the base layer, whereas a non-zero value for the layer identifier generally indicates that the corresponding layer is a non-base layer, e.g., an enhancement layer (or a dependent view, for multiview video coding).

Thus, video encoder 20 and video decoder 30 may be configured to code a first set of syntax elements of a slice header for a slice in accordance with a base video coding standard (e.g., HEVC) when the layer identifier has a value of zero (or other value indicating that the corresponding layer is the base layer). Likewise, video encoder 20 and video decoder 30 may be configured to code the first set of syntax elements in accordance with the base video coding standard, as well as a second set of syntax elements in accordance with an extension to the base video coding standard (e.g., MV-HEVC, 3D-HEVC, S-HEVC, or the like) when the layer identifier has a non-zero value (or other value indicating that the corresponding layer is not the base layer). When combined, the first and second sets of syntax elements may represent the full set of syntax elements for a slice header of a slice in the enhancement layer corresponding to the layer identifier.

As discussed above, one set of syntax elements that may be coded for an enhancement layer (or dependent view) is a set of one or more syntax elements for initialization and/or modification of reference picture lists. Video encoder 20 and video decoder 30 may be configured to initialize reference picture lists in accordance with any or all of the techniques of this disclosure, alone or in any combination. For example, video encoder 20 and video decoder 30 may be configured to code a slice header in accordance with Table 2 below:

TABLE 2

| slice_header( ) { | Descriptor |
|---|---|
|   first_slice_in_pic_flag | u(1) |
|   ... | |
|   if( slice_header_extension_present_flag ) { // should always be true in MV-HEVC | |
|     slice_header_extension_length | ue(v) |
|     if( slice_type != I_SLICE ) | |
|       inter_view_ref_start_position | ue(v) |
|     ... | |
|   } | |
|   byte_alignment( ) | |
| } | |

The slice header in the example of Table 2 includes an extra syntax element, inter_view_ref_start_position, relative to the conventional slice header of, e.g., HEVC WD8. Although not shown in Table 2, in some examples, this extra syntax element would only be present in slice headers having a layer identifier indicating that the slice occurs in a non-base layer (or non-base view), e.g., a layer_id not equal to zero. In some examples, video encoder 20 and video decoder 30 may code values for inter_view_ref_start_position in other positions of the slice header, rather than following slice_header_extension_length. In the example of Table 2, inter_view_ref_start_position may specify the starting position of the inter-view reference pictures in reference picture list 0 after reference picture list initialization. Inter_view_ref_start_position may have a value in the range of 0 to min (num_refidx_l0_active_minus1, NumPocStCurrBefore+

NumPocStCurrAfter+NumPocLtCurr), inclusive. Alternatively, inter_view_ref_start_position may have a value in the range of 0 to num_ref_idx_10_active_minus1, inclusive.

In the example of Table 2, inter_view_ref_start_position is coded as ue(v), that is, as an unsigned integer using Exp-Golomb coding. In other examples, video encoder 20 and video decoder 30 may instead code inter_view_ref_start_position as u(v), that is, as an unsigned integer using a variable number of bits. The number of bits used may depend on the number of bits used to code other syntax elements in the slice header. In some examples, video encoder 20 and video decoder 30 may further code a value for inter_view_ref_start_position_11, to specify the starting position of the inter-view reference pictures in reference picture list 1 after reference picture list initialization.

Video encoder 20 and video decoder 30 may construct RefPicListTemp0 in a manner that is different than HEVC WD8 and H.264/MVC. In particular, video encoder 20 and video decoder 30 may put the inter-view reference pictures in positions related to the inter_view_ref_start_position. For example, video encoder 20 and video decoder 30 may be configured to perform the following initialization process for reference picture lists, e.g., when coding a P or B slice header. Video encoder 20 and video decoder 30 may set variable NumRpsCurrTempList0 equal to Max (num_ref_idx_10_active_minus1+1, NumPocTotalCurr), and construct RefPicListTemp0 as follows:

```
cIdx = 0
while( cIdx < NumRpsCurrTempList0 – NumPocIvCurr) {
    for( i = 0; i < NumPocStCurrBefore && cIdx <
        NumRpsCurrTempList0; cIdx++, i++ )
        RefPicListTemp0[ cIdx ] = RefPicSetStCurrBefore[ i ]
    for( i = 0; i < NumPocStCurrAfter && cIdx <
        NumRpsCurrTempList0; cIdx++, i++ )           (F-25)
        RefPicListTemp0[ cIdx ] = RefPicSetStCurrAfter[ i ]
    for( i = 0; i < NumPocLtCurr && cIdx <
        NumRpsCurrTempList0; cIdx++, i++ )
        RefPicListTemp0[ cIdx ] = RefPicSetLtCurr[ i ]
}
for(cIdx = NumRpsCurrTempList0–1; cIdx >=
    inter_view_ref_start_position+ NumPocIvCurr; cdx--)
    RefPicListTemp0[ cIdx ] = RefPicSetIvCurr[cIdx –
        NumPocIvCurr]
for (i=0; i< NumPocIvCurr; i++)
    RefPicListTemp0[inter_view_ref_start_position+i] =
        RefPicSetIvCurr[i]
```

Video encoder 20 and video decoder 30 may then construct list RefPicList0 as follows:

```
for( cIdx = 0; cIdX ≤ num_ref_idx_l0_active_minus1;      (F-26)
    cIdx++)
    RefPicList0[ cIdx ] =
        ref_pic_list_modification_flag_l0 ?
            RefPicListTemp0[list_entry_l0[cIdx]] :
            RefPicListTemp0[cIdx]
```

When the slice is a B slice, video encoder 20 and video decoder 30 may set the variable NumRpsCurrTempList1 equal to Max(num_ref_idx_l1_active_minus1+1, NumPocTotalCurr) and construct list RefPicTemp1 as follows:

```
cIdx = 0
while( cIdx < NumRpsCurrTempList1 ) {
    for( i = 0; i < NumPocStCurrAfter && cIdx <
        NumRpsCurrTempList1; cIdx++, i++ )
        RefPicListTemp1[ cIdx ] =
            RefPicSetStCurrAfter[ i ]
    for( i = 0; i < NumPocStCurrBefore && cIdx <
        NumRpsCurrTempList1; cIdx++, i++ )           (F-27)
        RefPicListTemp1[ cIdx ] = RefPicSetStCurrBefore[ i ]
    for( i = 0; i < NumPocLtCurr && cIdx <
        NumRpsCurrTempList1; cIdx++, i++ )
        RefPicListTemp1[ cIdx ] = RefPicSetLtCurr[ i ]
    for( i = 0; i < NumPocIvCurr && cIdx <
        NumRpsCurrTempList1; cIdx++, i++ )
        RefPicListTemp1[ cIdx ] = RefPicSetIvCurr[ i ]
}
```

When the slice is a B slice, video encoder 20 and video decoder 30 may construct RefPicList1 as follows:

```
for( cIdx = 0; cIdX ≤ num_ref_idx_l1_active_minus1;      (F-28)
    cIdx++)
    RefPicList0[ cIdx ] =
        ref_pic_list_modification_flag_l1 ?
            RefPicListTemp1[list_entry_l1[cIdx]] :
            RefPicListTemp1[cIdx]
```

Alternatively, video encoder 20 and video decoder 30 may be configured to perform the following coding process. In this example, video encoder 20 and video decoder 30 may construct RefPicLIstTemp0 in a way that inter-view references still follow the temporal references. However, when constructing the initial reference picture list, video encoder 20 and video decoder 30 may place the inter-view references in earlier positions based on inter_view_ref_start_position. Inter_view_ref_start_position may have a value in the range of 0 to M=min (num_ref_idx_l0_active_minus1, NumPocStCurrBefore–1), inclusive. Alternatively, M may be set equal to min (num_ref_idx_l0_active_minus1, NumPocStCurrBefore+NumPocStCurrAfter+NumPocLtCurr+NumPocIvCurr–1). As another alternative, M may be set equal to min (num_ref_idx_l0_active_minus1, NumPocStCurrBefore+NumPocStCurrAfter+NumPocLtCurr–2). In still another alternative, M may be set equal to min (num_ref_idx_l0_active_minus1, NumPocStCurrBefore+NumPocStCurrAfter+NumPocLtCurr–1). Alternatively, inter_view_ref_start_position may be coded as u(v), with Ceil(Log 2(M+1)) bits.

Video encoder 20 and video decoder 30 may initialize the reference picture list, when coding a P or B slice header, as discussed below. Video encoder 20 and video decoder 30 may set the variable NumRpsCurrTempList0 equal to Max (num_ref_idx_l0_active_minus1+1, NumPocTotalCurr) and construct the list RefPicListTemp0 as follows:

```
cIdx = 0
while( cIdx < NumRpsCurrTempList0 ) {
    for( i = 0; i < NumPocStCurrBefore && cIdx <
        NumRpsCurrTempList0; cIdx++, i++ )
        RefPicListTemp0[ cIdx ] =
            RefPicSetStCurrBefore[ i ]
    for( i = 0; i < NumPocStCurrAfter && cIdx <
        NumRpsCurrTempList0; cIdx++, i++ )           (F-25)
        RefPicListTemp0[ cIdx ] = RefPicSetStCurrAfter[ i ]
    for( i = 0; i < NumPocLtCurr && cIdx <
        NumRpsCurrTempList0; cIdx++, i++ )
        RefPicListTemp0[ cIdx ] = RefPicSetLtCurr[ i ]
    for( i = 0; i < NumPocIvCurr && cIdx <
        NumRpsCurrTempList0; cIdx++, i++ )
        RefPicListTemp0[ cIdx ] = RefPicSetIvCurr[ i ]
}
NumTemporalRef = NumPocStCurrBefore +
    NumPocStCurrAfter + NumPocLtCurr;
```

-continued

```
for ( i=0; i < inter_view_ref_start_position; i++ )
    list_default_entry_l0 [i] = i;
for ( j=0; j< NumPocIvCurr; j++,i++)
    list_default_entry_l0 [i] = NumTemporalRef +j;
for ( ; i< NumRpsCurrTempList0; i++)
    list_default_entry_l0 [i]=i − NumPocIvCurr;
```

Video encoder 20 and video decoder 30 may then construct RefPicList0 as follows:

```
for( cIdx = 0; cIdX ≤ num_ref_idx_l0_active_minus1;        (F-26)
     cIdx++)
    RefPicList0[ cIdx ] =
        ref_pic_list_modification_flag_l0 ?
            RefPicListTemp0[list_entry_l0[cIdx]] :
            RefPicListTemp0[list_default_entry_l0[cIdx]]
```

When the slice is a B slice, video encoder 20 and video decoder 30 may set the variable NumRpsCurrTempList1 equal to Max(num_ref_idx_1_active_minus1+1, NumPocTotalCurr) and construct the list RefPicListTemp1 as follows:

```
cIdx = 0
while( cIdx < NumRpsCurrTempList1 ) {
    for( i = 0; i < NumPocStCurrAfter && cIdx <
         NumRpsCurrTempList1; cIdx++, i++ )
        RefPicListTemp1[ cIdx ] = RefPicSetStCurrAfter[ i ]
    for( i = 0; i < NumPocStCurrBefore && cIdx <
         NumRpsCurrTempList1; cIdx++, i++ )       (F-27)
        RefPicListTemp1[ cIdx ] = RefPicSetStCurrBefore[ i ]
    for( i = 0; i < NumPocLtCurr && cIdx <
         NumRpsCurrTempList1; cIdx++, i++ )
        RefPicListTemp1[ cIdx ] = RefPicSetLtCurr[ i ]
    for( i = 0; i < NumPocIvCurr && cIdx <
         NumRpsCurrTempList1; cIdx++, i++ )
        RefPicListTemp1[ cIdx ] = RefPicSetIvCurr[ i ]
}
```

When the slice is a B slice, video encoder 20 and video decoder 30 may construct list RefPicList1 as follows:

```
for( cIdx = 0; cIdX ≤ num_ref_idx_l1_active_minus1;        (F-28)
     cIdx++)
    RefPicList0[ cIdx ] =
        ref_pic_list_modification_flag_l1 ?
            RefPicListTemp1[ list_entry_l1[cIdx]] :
            RefPicListTemp1[cIdx]
```

Video encoder 20 and video decoder 30 may set the variable NumPocTotalCurr equal to NumPocStCurrBefore+NumPocStCurrAfter+NumPocLtCurr+NumPocIvCurr. In this example, RePIcSetIvCurr is the RPS subset of the inter-view reference pictures.

Alternatively, in the various examples above, similar decoding processes may be applied to reference picture list 1, with the starting position of inter-view reference pictures in the slice header.

In some examples, video encoder 20 and video decoder 30 may code a 2-bit indicator inter_view_pos_idc that indicates where to add the inter-view references in the RefPicListTemp0. Table 3 below summarizes one example of values of inter_view_pos_idc and semantics for each possible binary value of this two-bit indicator:

TABLE 3

| inter_view_pos_idc | 0 | 1 | 2 | 3 |
|---|---|---|---|---|
| Inter-view RPS positions | First RPS subset in RefPicList Temp0 | Inter-view RPS subset to be added in RefPicList Temp0 after RefPicSetSt CurrBefore | Inter-view RPS subset to be added in RefPicList Temp0 after RefPicSetSt CurrAfter | Inter-view RPS subset to be added at the end |

Video encoder 20 and video decoder 30 may be configured to perform the following process for initializing RefPicListTemp0.

```
cIdx = 0
while( cIdx < NumRpsCurrTempList0 ) {
    if (inter_view_pos_idc ==0)
        for( i = 0; i < NumPocIvCurr && cIdx <
             NumRpsCurrTempList0; cIdx++, i++ )
            RefPicListTemp0[ cIdx ] =
                RefPicSetIvCurr[ i ]
    for( i = 0; i < NumPocStCurrBefore && cIdx <
         NumRpsCurrTempList0; cIdx++, i++ )
        RefPicListTemp0[ cIdx ] = RefPicSetStCurrBefore[ i ]
    if (inter_view_pos_idc ==1)
        for( i = 0; i < NumPocIvCurr && cIdx <
             NumRpsCurrTempList0; cIdx++, i++ )
            RefPicListTemp0[ cIdx ] =
                RefPicSetIvCurr[ i ]
    for( i = 0; i < NumPocStCurrAfter && cIdx <
         NumRpsCurrTempList0; cIdx++, i++ )       (F-25)
        RefPicListTemp0[ cIdx ] = RefPicSetStCurrAfter[ i ]
    if (inter_view_pos_idc ==2)
        for( i = 0; i < NumPocIvCurr && cIdx <
             NumRpsCurrTempList0; cIdx++, i++ )
            RefPicListTemp0[ cIdx ] = RefPicSetIvCurr[ i ]
    for( i = 0; i < NumPocLtCurr && cIdx <
         NumRpsCurrTempList0; cIdx++, i++ )
        RefPicListTemp0[ cIdx ] = RefPicSetLtCurr[ i ]
    if (inter_view_pos_idc ==3)
        for( i = 0; i < NumPocIvCurr && cIdx <
             NumRpsCurrTempList0; cIdx++, i++ )
            RefPicListTemp0[ cIdx ] = RefPicSetIvCurr[ i ]
}
```

Video encoder 20 and video decoder 30 may code inter_view_pos_idc in slice header, picture parameter set (PPS), sequence parameter set (SPS), adaptation parameter set (APS), or video parameter set (VPS).

In some examples, video encoder 20 and video decoder 30 may originally place inter-view reference pictures after RefPicSetStCurrBefore. For example, when coding a P or B slice header, video encoder 20 and video decoder 30 may set the variable NumRpsCurrTempList0 equal to Max (num_refidx_l0_active_minus1+1, NumPocTotalCurr) and construct the list RefPicListTemp0 as follows:

```
cIdx = 0
while( cIdx < NumRpsCurrTempList0 ) {
    for( i = 0; i < NumPocStCurrBefore && cIdx <
        NumRpsCurrTempList0; cIdx++, i++ )
        RefPicListTemp0[ cIdx ] = RefPicSetStCurrBefore[ i ]
    for( i = 0; i < NumPocIvCurr && cIdx <
        NumRpsCurrTempList0; cIdx++, i++ )
        RefPicListTemp0[ cIdx ] = RefPicSetIvCurr[ i ]
    for( i = 0; i < NumPocStCurrAfter && cIdx <
        NumRpsCurrTempList0; cIdx++, i++ )                        (F-25)
        RefPicListTemp0[ cIdx ] = RefPicSetStCurrAfter[ i ]
    for( i = 0; i < NumPocLtCurr && cIdx <
        NumRpsCurrTempList0; cIdx++, i++ )
        RefPicListTemp0[ cIdx ] = RefPicSetLtCurr[ i ]
}
for ( i=0; i < inter_view_ref_start_position; i++ )
    list_default_entry_l0 [i] = i;
for ( j=0; j< NumPocIvCurr; j++,i++)
    list_default_entry_l0 [i] = NumPocStCurrBefore +j;
for ( ; i< NumRpsCurrTempList0; i++)
    list_default_entry_l0 [i]=i − NumPocIvCurr;
```

Video encoder 20 and video decoder 30 may then construct list RefPicList0 as follows:

```
for( cIdx = 0; cIdX ≤ num_ref_idx_l0_active_minus1;         (F-26)
    cIdx++)
    RefPicList0[ cIdx ] =
    ref_pic_list_modification_flag_l0 ?
        RefPicListTemp0[ list_entry_l0[ cIdx ] ] :
        RefPicListTemp0[list_default_entry_l0[cIdx] ]
```

When the slice is a B slice, video encoder 20 and video decoder 30 may set the variable NumRpsCurrTempList1 equal to Max(num_ref_idx_l1_active_minus1+1, NumPocTotalCurr) and construct the list RefPicListTemp1 as follows:

```
cIdx = 0
while( cIdx < NumRpsCurrTempList1 ) {
    for( i = 0; i < NumPocStCurrAfter && cIdx <
        NumRpsCurrTempList1; cIdx++, i++ )
        RefPicListTemp1[ cIdx ] = RefPicSetStCurrAfter[ i ]
    for( i = 0; i < NumPocStCurrBefore && cIdx <
        NumRpsCurrTempList1; cIdx++, i++ )                        (F-27)
        RefPicListTemp1[ cIdx ] = RefPicSetStCurrBefore[ i ]
    for( i = 0; i < NumPocLtCurr && cIdx <
        NumRpsCurrTempList1; cIdx++, i++ )
        RefPicListTemp1[ cIdx ] = RefPicSetLtCurr[ i ]
    for( i = 0; i < NumPocIvCurr && cIdx <
        NumRpsCurrTempList1; cIdx++, i++ )
        RefPicListTemp1[ cIdx ] = RefPicSetIvCurr[ i ]
}
```

Alternatively, video encoder 20 and video decoder 30 may construct the list RefPicListTemp1 as follows:

```
cIdx = 0
while( cIdx < NumRpsCurrTempList1 ) {
    for( i = 0; i < NumPocStCurrAfter && cIdx <
        NumRpsCurrTempList1; cIdx++, i++ )
        RefPicListTemp1[ cIdx ] = RefPicSetStCurrAfter[ i ]
    for( i = 0; i < NumPocStCurrBefore && cIdx <
        NumRpsCurrTempList1; cIdx++, i++ )                        (F-27)
        RefPicListTemp1[ cIdx ] = RefPicSetStCurrBefore[ i ]
    for( i = 0; i < NumPocIvCurr && cIdx <
        NumRpsCurrTempList1; cIdx++, i++ )
        RefPicListTemp1[ cIdx ] = RefPicSetIvCurr[ i ]
    for( i = 0; i < NumPocLtCurr && cIdx <
        NumRpsCurrTempList1; cIdx++, i++ )
        RefPicListTemp1[ cIdx ] = RefPicSetLtCurr[ i ]
}
```

When the slice is a B slice, video encoder 20 and video decoder 30 may construct list RefPicList1 as follows:

```
for( cIdx = 0; cIdX ≤ num_ref_idx_l1_active_minus1;         (F-28)
    cIdx++)
    RefPicList0[ cIdx ] =
    ref_pic_list_modification_flag_l1 ?
        RefPicListTemp1[list_entry_l1[cIdx]] :
        RefPicListTemp1[cIdx]
```

Video encoder 20 and video decoder 30 may set variable NumPocTotalCurr equal to NumPocStCurrBefore+NumPocStCurrAfter+NumPocLtCurr+NumPocIvCurr. In this example, RePIcSetIvCurr is the RPS subset of the inter-view reference pictures.

Alternatively, video encoder 20 and video decoder 30 may code slice headers in accordance with Table 4 below:

TABLE 4

| slice_header( ) { | Descriptor |
|---|---|
| first_slice_in_pic_flag | u(1) |
| ... | |
| if( slice_header_extension_present_flag ) { // should always be true in MV-HEVC | |
|   slice_header_extension_length | ue(v) |
|   if( slice_type != I_SLICE ) { | |
|     inter_view_ref_pos_default_flag | u(1) |
|     if( ! inter_view_ref_pos_default_flag ) | |
|       inter_view_ref_start_position | ue(v) |
|   } | |
|   ... | |
| } | |
| byte_alignment( ) | |
| } | |

In this example, two additional syntax elements are added to the slice header following slice_header_extension_length, relative to HEVC WD8. Alternatively, the newly introduced syntax elements can be presented in other places of the slice header and present before reference picture list modification (RPLM) syntax elements. Inter_view_ref_pos_default_flag equal to 1 may indicate inter-view reference pictures are inserted in the default starting position of the reference picture list 0 and inter_view_ref_start_position is derived to be NumPocStCurrBefore. Inter_view_ref_pos_default_flag equal to 0 may indicate that the starting position of the inter-view reference pictures is decided by inter_view_ref_start_position.

Alternatively, inter_view_ref_pos_default_flag equal to 1 may indicate inter-view reference pictures are inserted in the default starting position of the reference picture list 0, while inter_view_ref_pos_default_flag equal to 0 may indicate the starting position of the inter-view reference pictures is decided by inter_view_ref_start_position. Video encoder 20 and video decoder 30 may derive the default position as follows. First, video encoder 20 and video decoder 30 may set the KeyPicPoc as the POC value of the picture in Decoded Picture Buffer (DPB) with a largest POC value among all the pictures in DPB with temporalID equal to 0 and with POC value smaller than the current POC. If all of the short-term reference pictures have a smaller POC value than KeyPicPoc, inter_view_ref_start_position may be derived to be equal to 1; otherwise, inter_view_ref_start_position may be derived to be NumPocStCurrBefore.

In this example, inter_view_ref_start_position may specify the starting position of the inter-view reference pictures in reference picture list 0 after reference picture list initialization. Inter_view_ref_start_position may have a value in the range of 0 to min (num_ref_idx_l0_active_minus1, NumPocStCurrBefore+NumPocStCurrAfter+NumPocLtCurr), inclusive. Alternatively, inter_view_ref_start_position may have a value in the range of 0 to num_ref_idx_l0_active_minus1, inclusive. The coding process for reference picture list initialization may be the same as any of the techniques as described above.

Alternatively, the two syntax elements inter_view_ref_pos_default_flag and inter_view_ref_start_position may be replaced by a single syntax element inter_view_ref_start_position_plus 1. Inter_view_ref_start_position_plus 1 equal to zero may indicate that not explicit start position is signaled for the inter-view reference pictures. For other values of inter_view_ref_start_position_plus1, inter_view_ref_start_position_plus 1 minus 1 may indicate the start position of inter-view reference pictures in the reference picture list.

Alternatively, video encoder 20 and video decoder 30 may code slice headers in accordance with Table 5 below, where underlined text represents additions relative to HEVC WD8:

Alternatively, the newly introduced syntax elements (as underlined) can be presented in other places of the slice header and present before RPLM syntax elements. Alternatively, the default start position for the inter-view reference pictures might only signaled for RefPicList0, and the decoding process for RefPicList1 may remain the same as current MV-HEVC specification. In this case, the reference picture list initialization process for RefPicList1 may be kept unchanged.

In the example of Table 5, inter_view_ref_start_position_LX_plus1 specifies the starting position of the inter-view reference pictures in reference picture list X after reference picture list initialization. Inter_view_ref_start_position_LX_plus 1 is in the range of 0 to min (num_ref_idx_1X_active_minus1+1, NumPocStCurrBefore+NumPocStCurrAfter+NumPocLtCurr), inclusive. When inter_view_ref_start_position_LX_plus1 is equal to zero, in the example of Table 5, the interview reference pictures are present in the default position in the reference picture list. For other non-zero values, in the example of Table 5, inter_view_ref_start_position_LX_plus1 minus 1 denotes the start position of inter-view reference pictures in the initial reference picture list. When not present, inter_view_ref_start_position_LX_plus 1 may be inferred to be a default value, which may be equal to NumPocStCurrBefore+NumPocStCurrAfter+NumPocLtCurr+1.

Video encoder 20 and video decoder 30 may be configured to derive a value InterViewRefStartPosLX as follows:

```
if( inter_view_ref_start_position_LX_plus1 = = 0 )
        InterViewRefStartPosLX = NumPocStCurrBefore +
        NumPocStCurrAfter + NumPocLtCurr
else
        InterViewRefStartPosLX =
        inter_view_ref_start_position_LX_plus1 - 1
```

Alternatively, inter_view_ref_start_position_LX_plus1 may be signaled as two syntax elements, inter_view_ref_start_position_flag_LX and inter_view_ref_start_position_LX, where inter_view_ref_start_position_LX may be signaled conditioned if and only if the value of inter_view_ref_start_position_flag_LX is equal to 1. Inter_view_ref_start_position_LX may specify the starting position of the inter-view reference pictures in reference picture list X after reference picture list initialization. Inter_view_ref_start_position may be in the range of 0 to min (num_ref_idx_1X_active_minus 1, NumPocStCurrBefore+NumPocStCurrAfter+NumPocLtCurr), inclusive. When not present, inter_view_ref_start_position_LX may be inferred to be equal to (NumPocStCurrBefore+NumPocStCurrAfter+NumPocLtCurr).

TABLE 5

| slice_header( ) { | Descriptor |
|---|---|
|   first_slice_in_pic_flag | u(1) |
|   ... | |
|   if( slice_header_extension_present_flag ) { // should always be true in MV-HEVC | |
|     slice_header_extension_length | ue(v) |
|     if( slice_type != I && viewIdx > 0 ) | |
|       inter_view_ref_start_position_L0_plus1 | ue(v) |
|     if( slice_type = = B && viewIdx > 0 ) | |
|       inter_view_ref_start_position_L1_plus1 | ue(v) |
|     ... | |
|   } | |
|   byte_alignment( ) | |
| } | |

In some examples, when inter_view_ref_start_position_LX_plus1 is equal to 1, the reference picture list initialization might not be changed, and thus, may be the same as specified in the MV-HEVC working draft.

Video decoder 30 may be configured to perform the following during the decoding process, when implemented according to Table 5 above. In particular, video decoder 30 may perform the following process when decoding a P or B slice header. Video decoder 30 may set the variable NumRpsCurrTempList0 equal to Max (num_ref_idx_l0_active_minus1+1, NumPocTotalCurr). Video decoder 30 may then construct the list RefPicListTemp0 as follows:

```
cIdx = 0
while( cIdx < NumRpsCurrTempList0 - NumPocIvCurr ) {
    for( i = 0; i < NumPocStCurrBefore && cIdx <
        NumRpsCurrTempList0; cIdx++, i++ )
        RefPicListTemp0[ cIdx ] =
            RefPicSetStCurrBefore[ i ]
    for( i = 0; i < NumPocStCurrAfter && cIdx <           (F-25)
        NumRpsCurrTempList0; cIdx++, i++ )
        RefPicListTemp0[ cIdx ] =
            RefPicSetStCurrAfter[ i ]
    for( i = 0; i < NumPocLtCurr && cIdx <
        NumRpsCurrTempList0; cIdx++, i++ )
        RefPicListTemp0[ cIdx ] = RefPicSetLtCurr[ i ]
}
for(cIdx = NumRpsCurrTempList0-1; cIdx >=
    InterViewRefStartPosL0 +
    NumPocIvCurr; cdx --)
    RefPicListTemp0[ cIdx ] = RefPicListTemp0[ cIdx-
        NumPocIvCurr ]
for (i=0; i< NumPocIvCurr; i++)
    RefPicListTemp0[InterViewRefStartPosL0 + i] =
        RefPicSetIvCurr[ i ]
```

Video decoder 30, in accordance with the example of Table 5, may then construct the list RefPicList0 as follows:

```
for( cIdx = 0; cIdX ≤ num_ref_idx_l0_active_minus1;    (F-26)
    cIdx++)
    RefPicList0[ cIdx ] =
        ref_pic_list_modification_flag_l0 ?
            RefPicListTemp0[list_entry_l0[cIdx]] :
            RefPicListTemp0[cIdx]
```

When the slice is a B slice, video decoder 30, in accordance with the example of Table 5, may set the variable NumRpsCurrTempList1 equal to Max (num_ref_idx_l1_active_minus1+1, NumPocTotalCurr). Video decoder 30 may then construct the list RefPicListTemp1 as follows:

```
cIdx = 0
while( cIdx < NumRpsCurrTempList1 - NumPocIvCurr ) {
    for( i = 0; i < NumPocStCurrAfter && cIdx < NumRpsCurrTempList1;
        cIdx++, i++ )
        RefPicListTemp1[ cIdx ] = RefPicSetStCurrAfter[ i ]
    for( i = 0; i < NumPocStCurrBefore && cIdx < NumRpsCurrTempList1;
        cIdx++, i++ )                                   (F-27)
        RefPicListTemp1[ cIdx ] = RefPicSetStCurrBefore[ i ]
    for( i = 0; i < NumPocLtCurr && cIdx < NumRpsCurrTempList1;
        cIdx++, i++ )
        RefPicListTemp1[ cIdx ] = RefPicSetLtCurr[ i ]
}
for(cIdx = NumRpsCurrTempList1 1; cIdx >= InterViewRefStartPosL1 +
    NumPocIvCurr; cdx --)
    RefPicListTemp1[ cIdx ] = RefPicListTemp1[ cIdx- NumPocIvCurr ]
for (i=0; i< NumPocIvCurr; i++)
    RefPicListTemp1[InterViewRefStartPosL1 +i] = RefPicSetIvCurr[ i ]
```

When the slice is a B slice, video decoder 30, in accordance with the example of Table 5, may construct the list RefPicList1 as follows:

```
for( cIdx = 0; cIdX ≤ num_ref_idx_l1_active_minus1;    (F-28)
    cIdx++)
    RefPicList1[ cIdx ] = ref_pic_list_modification_flag_l1 ?
        RefPicListTemp1[list_entry_l1[cIdx]] : RefPicListTemp1[cIdx]
```

Similar to the above described examples, with inter-view reference start positions signaled for RefPIcListX is signaled in u(v), while the range of inter_view_ref_start_position or inter_view_ref_start_position_LX_plus1 are in a smaller range, thus consumes less bits.

For example, inter_view_ref_start_position may be in the range of 0 to min (num_ref_idx_l0_active_minus1, NumPocStCurrBefore), inclusive.

Alternatively, as in another example, inter_view_ref_start_position is in the range of 0 to min (num_ref_idx_l0_active_minus1, NumPocStCurrBefore+NumPocStCurrAfter), inclusive; and inter_view_ref_start_position_LX_plus1 is in the range of min (num_ref_idx_1X_active_minus1+1, (X ? NumPocStCurrAfter: NumPocStCurrBefore)).

Alternatively, as in another example, inter_view_ref_start_position_LX_plus1 is in the range of min (num_ref_idx_1X_active_minus1+1, NumPocStCurrBefore+NumPocStCurrAfter), The default value of each of the above syntax elements, when not present, is adapted to be aligned with the range of the syntax element.

An another example, similar to certain other examples above, inter_view_ref_pos_default_flag is extended to both RefPicList0 and RefPicList1. Inter_view_ref_start_position or inter_view_ref_start_position_LX are signaled as u(v), with the following range. In one such example, inter_view_ref_start_position is in the range of 0 to min (num_ref_idx_10_active_minus1, NumPocStCurrBefore), inclusive. inter_view_ref_start_position_LX is in the range of min (num_ref_idx_lX_active_minus1, (X ? NumPocStCurrAfter: NumPocStCurrBefore)−1).

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). A device including video encoder 20 and/or video decoder 30 may comprise an integrated circuit, a microprocessor, and/or a wireless communication device, such as a cellular telephone.

Figure 2:
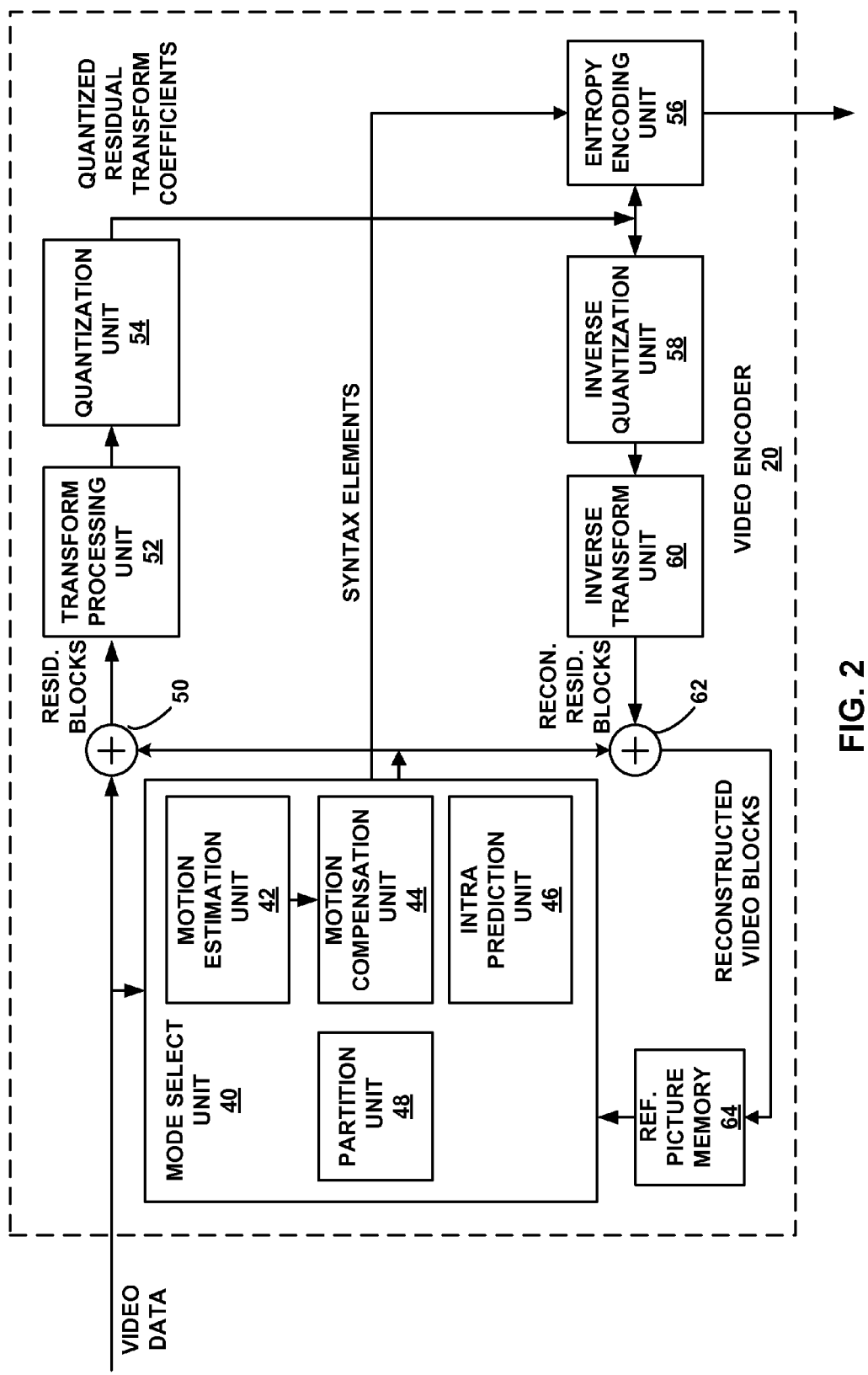
FIG. 2 is a block diagram illustrating an example of a video encoder that may implement techniques for constructing reference picture lists.

FIG. 2 is a block diagram illustrating an example of video encoder 20 that may implement techniques for constructing reference picture lists. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 2, video encoder 20 receives a current video block within a video frame to be encoded. In the example of FIG. 2, video encoder 20 includes mode select unit 40, reference picture memory 64, summer 50, transform processing unit 52, quantization unit 54, and entropy encoding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit).

A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identifies one or more reference pictures stored in reference picture memory 64.

In accordance with the techniques of this disclosure, when encoding a slice of a non-base layer (which may include a slice of a non-base view), motion estimation unit 42 may also calculate an inter-view motion vector (e.g., a disparity motion vector for inter-view prediction). Thus, video encoder 20 may add identifiers for inter-layer (or inter-view) reference pictures to the reference picture list at particular positions, such that video encoder 20 can encode syntax elements representative of the positions for the identifiers.

As discussed above, the syntax elements may have values representative of where to place the inter-layer reference pictures during a reference picture initialization process. For instance, the syntax elements may indicate that inter-layer reference pictures are to be placed consecutively in the reference picture list, that inter-view reference pictures are to be placed at the beginning of an initial reference picture list for the current slice, that inter-view reference pictures are to be placed after temporal reference pictures with smaller picture order count (POC) values than a POC value of the current slice, that inter-view reference pictures are to be placed after temporal reference pictures with larger POC values than a POC value of the current slice, or that inter-view reference pictures are to be placed after long term reference pictures.

Motion estimation unit 42 sends the calculated motion vector to entropy encoding unit 56 and motion compensation unit 44. Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists.

Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46

(or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used.

In any case, transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference picture memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference picture memory 64. The reconstructed video block may be used by motion estimation unit 42 and motion compensation unit 44 as a reference block to inter-code a block in a subsequent video frame.

Although primarily described with respect to temporal prediction, video encoder 20 may also be configured to perform inter-view prediction. Motion estimation unit 42 and motion compensation unit 44 may also be configured to perform disparity estimation and disparity compensation, respectively, e.g., relative to an inter-view prediction reference picture. Thus, video encoder 20 may be configured to utilize the techniques of this disclosure to construct a reference picture list including identifiers for inter-view reference pictures.

In accordance with certain techniques of this disclosure, video encoder 20 may be configured to code multi-layer video data (which may include multi-view video data). For instance, video encoder 20 may be configured to encode one or more layers (e.g., one or more views) in accordance with an extension to a base video coding standard. As an example, video encoder 20 may be configured to encode non-base layers in accordance with an S-HEVC extension, or non-base views in accordance with an MV-HEVC or 3D-HEVC extension. Video encoder 20 may be configured to encode base layer video data in accordance with the base video coding standard, e.g., HEVC.

By coding base layer (or base view) data in accordance with a base video coding standard, video encoder 20 need not encode syntax elements for an extension to the base video coding standard for the base layer. For instance, with respect to the examples above, because base layer video data cannot be inter-layer predicted, there would be no reason to code syntax elements representative of where to position identifiers for inter-layer reference pictures in a reference picture list for the base layer. Thus, video encoder 20 may omit coding of such syntax elements for the base layer video data.

However, video encoder 20 may encode non-base-layer video data (e.g., slices having a layer identifier in a slice header with a non-zero value) in accordance with an extension to the base video coding standard, such as S-HEVC, MV-HEVC, or 3D-HEVC. Thus, video encoder 20 may encode both the syntax elements for the base video coding standard and another, additional set of syntax elements as defined by the extension. Such additional set of syntax elements may include, for example, one or more syntax elements representative of where to position inter-layer reference pictures in a reference picture list, as discussed above.

Video encoder 20 of FIG. 2 represents an example of a video coder configured to code a value for a layer identifier in a slice header for a current slice in a current layer of multi-layer video data, and, when the value for the layer identifier is not equal to zero, code a first set of syntax elements in accordance with a base video coding standard, and code a second set of one or more syntax elements in accordance with an extension to the base video coding standard.

Video encoder 20 of FIG. 2 also represents an example of a video coder configured to determine, for construction of a reference picture list for a current slice of a current view, a position for an identifier of an inter-view reference picture of a reference view, construct the reference picture list such that the identifier of the inter-view reference picture is located in the determined position of the reference picture list, code an index value corresponding to the determined position for a portion of the current slice, and code the portion of the current slice using the inter-view reference picture based on the index value.

Figure 3:
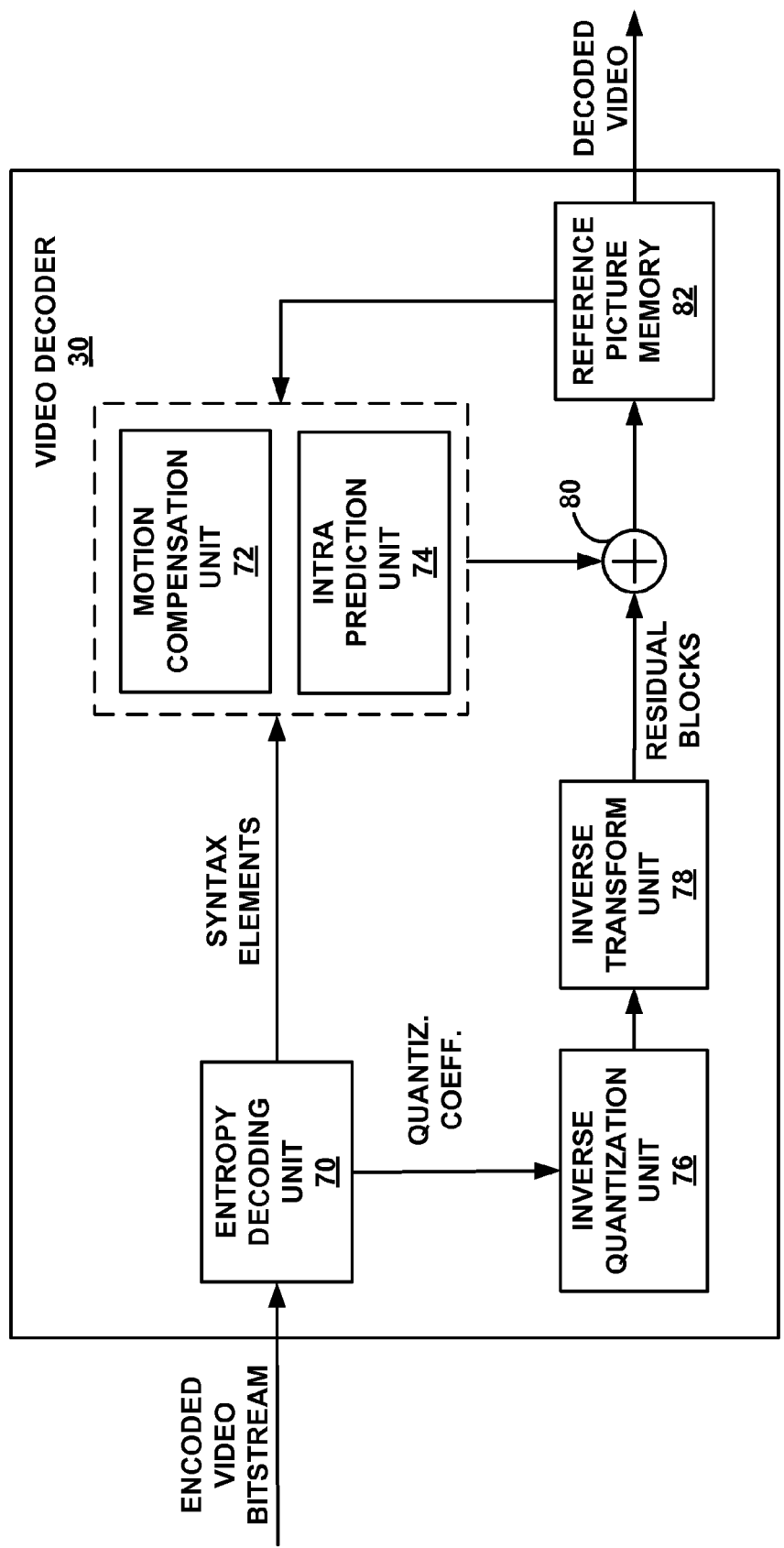
FIG. 3 is a block diagram illustrating an example of a video decoder that may implement techniques for constructing reference picture lists.

FIG. 3 is a block diagram illustrating an example of video decoder 30 that may implement techniques for constructing reference picture lists. In the example of FIG. 3, video decoder 30 includes an entropy decoding unit 70, motion compensation unit 72, intra prediction unit 74, inverse quantization unit 76, inverse transformation unit 78, reference picture memory 82 and summer 80. Video decoder 30 may, in some examples, perform a decoding pass generally reciprocal to the encoding pass described with respect to video encoder 20 (FIG. 2).

In accordance with the techniques of this disclosure, video decoder 30 may determine whether a slice of multi-layer video data is in a base layer or in a non-base layer (e.g., an enhancement layer or a dependent view). For example, video decoder 30 may decode a layer identifier in a slice header of the slice has a value indicating that the slice is in a base layer or in a non-base layer. For multi-view video data, the layer identifier may correspond to a view identifier (view_id). In some examples, a value of zero for the layer identifier indicates that the slice is in the base layer, and a value other than zero for the layer identifier indicates that the slice is in a non-base layer, e.g., an enhancement layer or a dependent view.

When video decoder 30 determines that the slice is in the base layer, video decoder 30 may decode a first set of syntax elements, conforming to a base video coding standard. When video decoder 30 determines that the slice is in a non-base layer (e.g., an enhancement layer or a dependent view), video decoder 30 may decode a second set of syntax elements, conforming to an extension to the base video coding standard, in addition to the first set of syntax elements. The first and second sets of syntax elements may be coded as part of any of, or any combination of, a sequence parameter set (SPS), a picture parameter set (PPS), a slice header, or the like.

In general, the second set of syntax elements includes data for the extension to the base video coding standard that are not relevant to the base video coding standard. For example, the second set of syntax elements may include one or more syntax elements related to how to construct a reference picture list to include inter-layer (including inter-view) reference pictures. For instance, the one or more syntax elements, in this example, may indicate that inter-view reference pictures are to be placed consecutively in the reference picture list, placed at the beginning of an initial reference picture list, after temporal reference pictures with smaller picture order count (POC) values than a POC value of a current slice (for which the reference picture list is being constructed), or after long-term reference pictures.

In the example discussed above, video decoder 30 may construct a reference picture list, for slices in an enhancement layer or dependent view, according to the additional syntax elements. The reference picture list construction process may include constructing a temporal reference picture list including temporal reference pictures in an order that is based, at least in part, on the position of the inter-layer or inter-view reference pictures.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

Motion compensation unit 72 may generate prediction data based on motion vectors received from entropy decoding unit 70, while intra-prediction unit 74 may generate prediction data based on intra-prediction mode indicators received from entropy decoding unit 70. When the video slice is coded as an intra-coded (I) slice, intra prediction unit 74 may generate prediction data for a video block of the current video slice based on a signaled intra prediction mode and data from previously decoded blocks of the current frame or picture. When the video frame is coded as an inter-coded (i.e., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference picture memory 82 (also referred to as a decoded picture buffer).

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, i.e., de-quantizes, the quantized transform coefficients provided in the bitstream and decoded by entropy decoding unit 70. The inverse quantization process may include use of a quantization parameter $QP_Y$ calculated by video decoder 30 for each video block in the video slice to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 82, which stores reference pictures used for subsequent motion compensation. Reference picture memory 82 also stores decoded video for later presentation on a display device, such as display device 32 of FIG. 1.

Although primarily described with respect to temporal prediction, video decoder 30 may also be configured to perform inter-view prediction. Motion compensation unit 72 may also be configured to perform disparity compensation, e.g., relative to an inter-view prediction reference picture. Thus, video decoder 30 may be configured to utilize the techniques of this disclosure to construct a reference picture list including identifiers for inter-view reference pictures.

Video decoder 30 of FIG. 3 represents an example of a video coder configured to code a value for a layer identifier in a slice header for a current slice in a current layer of multi-layer video data, and, when the value for the layer identifier is not equal to zero, code a first set of syntax elements in accordance with a base video coding standard, and code a second set of one or more syntax elements in accordance with an extension to the base video coding standard.

Video decoder 30 of FIG. 3 also represents an example of a video coder configured to determine, for construction of a reference picture list for a current slice of a current view, a position for an identifier of an inter-view reference picture of a reference view, construct the reference picture list such that the identifier of the inter-view reference picture is located in the determined position of the reference picture list, code an index value corresponding to the determined position for a portion of the current slice, and code the portion of the current slice using the inter-view reference picture based on the index value.

Figure 4:
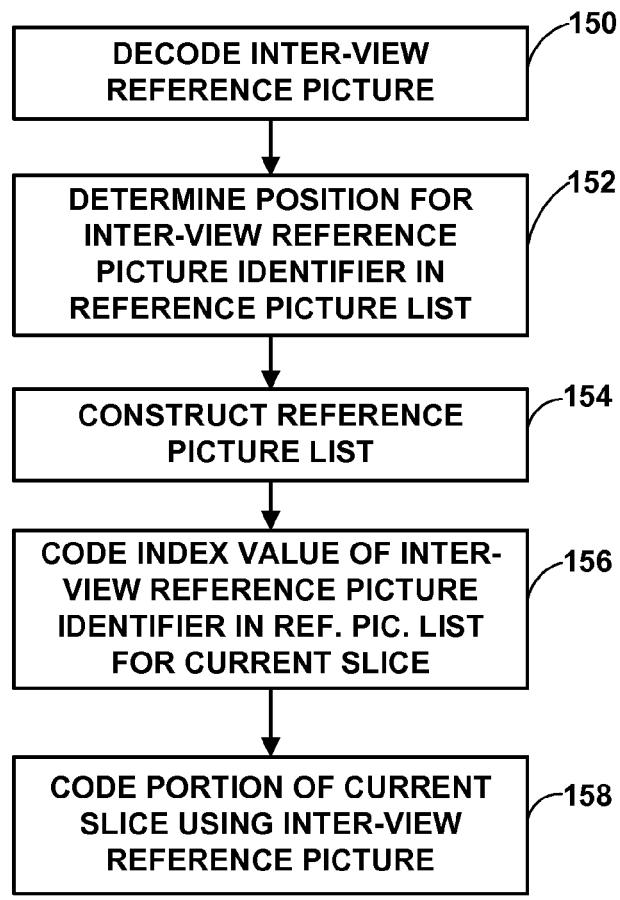
FIG. 4 is a flowchart illustrating an example method for constructing a reference picture list and using the reference picture list when coding a portion of a current slice.

FIG. 4 is a flowchart illustrating an example method for constructing a reference picture list and using the reference picture list when coding a portion of a current slice. Video encoder 20 and video decoder 30 may be configured to perform the method of FIG. 4, or a substantially similar method. For purposes of explanation, the method of FIG. 4 is explained with respect to video decoder 30, although it should be understood that video encoder 20 may also be configured to perform a similar method. Certain additional or alternative steps may be performed by video encoder 20, as noted below.

Video decoder 30 may first receive and decode an inter-view reference picture (150). In particular, video decoder 30 may decode pictures (including one or more slices) in various views, e.g., in a time-first order. That is, the bitstream may be constructed in such a way that data for all pictures at the same temporal instance are present together in the bitstream, e.g., in a common access unit. Thus, video decoder 30 may decode the pictures of an access unit in the order in which these pictures occur in the access unit, and hence, in the bitstream.

When the method is performed by video encoder 20, video encoder 20, or another unit communicatively coupled to video encoder 20, such as a multiplexer, may assemble the video data into the bitstream in this arrangement, e.g., encapsulating video data for pictures of a common temporal instance into an access unit. Video decoder 30 may buffer decoded data for the inter-view reference picture in reference picture memory 82.

Video decoder 30 may then obtain video data for a current slice of a picture (view component) in a different view of the same access unit. Data of the current slice may be coded relative to the inter-view reference picture, using inter-view prediction. When the method is performed by video encoder 20, video encoder 20 may test various prediction modes to determine whether inter-view prediction is appropriate, e.g., using rate-distortion optimization. In any case, video decoder 30 may determine a position for an inter-view reference picture identifier in a reference picture list (152).

The reference picture list may include an ordered set of identifiers for reference pictures, e.g., stored in reference picture memory 82 (also referred to as a decoded picture buffer). The reference picture list, in accordance with the techniques of this disclosure, may include identifiers for both temporal reference pictures (reference pictures of the current view) and one or more identifiers for inter-view reference pictures. Video decoder 30 may be configured to determine the position for the inter-view reference picture identifier using any of the techniques described above, alone or in any combination. Video decoder 30 may then construct the reference picture list (154), such that the inter-view reference picture identifier is located in the position determined in step 152.

Video decoder 30 may then code an index value of the inter-view reference picture identifier in the reference picture list for the current slice (156). That is, in this example, video decoder 30 may receive the index value and decode the index value, where in this instance, the index value corresponds to the position of the inter-view reference picture identifier in the reference picture list. In this manner, video decoder 30 may determine that the inter-view reference picture is to be used to decode a portion of the current slice. The index value may be coded as motion information for a block, such as a prediction unit (PU), of the current slice, and in particular, as a reference index in the motion information.

When the method is performed by video encoder 20, video encoder 20 may, as explained above, determine that a particular block of the current slice should be predicted using inter-view prediction, and therefore, code the index value accordingly. It should also be understood that in general, the index value may correspond to any of the reference picture identifiers in the reference picture list; in this specific example, however, the index corresponds to the identifier of the inter-view reference picture, to illustrate the techniques of this disclosure.

Furthermore, because the index value corresponds to the inter-view reference picture identifier in the reference picture list, video decoder 30 may decode the corresponding portion of the current slice using the inter-view reference picture (158). For example, assuming the portion corresponds to a block, e.g., a PU, video decoder 30 may receive other motion information that defines, for example, a disparity motion vector for the block. Video decoder 30 (e.g., motion compensation unit 72 of video decoder 30) may use the disparity motion vector to retrieve a predicted block for the current block. Video decoder 30 may also decode residual information (e.g., quantized transform coefficients) and combine the residual information (following inverse quantization and inverse transformation) with the predicted block to decode the current block. Video encoder 20, on the other hand, may calculate the residual information as a set of pixel-by-pixel differences between an original block and the predicted block, and then transform and quantize the residual information.

In this manner, the method of FIG. 4 represents an example of a method of coding (e.g., encoding or decoding) video data, the method including determining, for construction of a reference picture list for a current slice of a current view, a position for an identifier of an inter-view reference picture of a reference view, constructing the reference picture list such that the identifier of the inter-view reference picture is located in the determined position of the reference picture list, coding an index value corresponding to the determined position for a portion of the current slice, and coding the portion of the current slice using the inter-view reference picture based on the index value.

Figure 5:
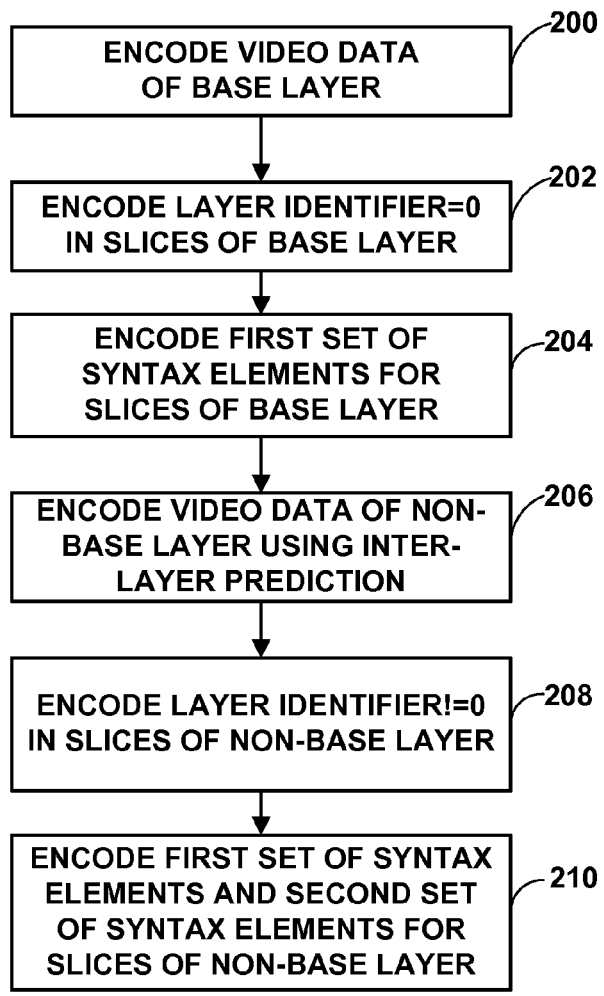
FIG. 5 is a flowchart illustrating an example method for encoding multi-layer video data using different video coding standards, in accordance with the techniques of this disclosure.

FIG. 5 is a flowchart illustrating an example method for encoding multi-layer video data using different video coding standards, in accordance with the techniques of this disclosure. Although explained with respect to video encoder 20 of FIGS. 1 and 2, it should be understood that other video encoding devices may be configured to perform a similar technique. For example, a video encoder or video transcoder may be configured to perform techniques similar to those of FIG. 5.

Initially, video encoder 20 may encode video data of a base layer (200). In particular, video encoder 20 may encode the video data of the base layer according to a base video coding standard, such as HEVC. For example, for intra-coded pictures (I-pictures), video encoder 20 may encode blocks of one or more slices using intra-prediction, and for inter-coded pictures (P-pictures and B-pictures), video encoder 20 may encode blocks of one or more slices using any of intra-prediction, single directional inter-prediction, or (for B-pictures) bi-prediction. As encoded, the video data of the base layer may form a bitstream that conforms to the base video coding standard.

Video encoder 20 may also encode a layer identifier having a value of zero in slice headers of the slices in the base layer (202). The value of zero is used when a value of zero for a layer identifier corresponds to the base layer. For multi-view video coding, it is assumed that the value of zero for the layer identifier (e.g., a view identifier) corresponds to a base view. In examples where a non-zero value for a layer (or view) identifier corresponds to the base layer/view, video encoder 20 may encode the value for the layer identifier in a slice header of a slice of the base layer that corresponds to the base layer.

In addition, video encoder 20 may encode a first set of syntax elements for the slices of the base layer (204). For example, video encoder 20 may encode syntax elements of one or more sequence parameter sets (SPSs), picture parameter sets (PPSs), and/or slice headers for slices of the base layer. These syntax elements may conform to the specifications of the base video coding standard. Moreover, the syntax elements need not include syntax data of an extension to the base video coding standard.

Video encoder 20 may then encode video data of a non-base layer using inter-layer prediction (206). That is, video encoder 20 may encode at least some blocks of the non-base layer (e.g., an enhancement layer of a scalable extension or a dependent view for multi-view video data) using inter-layer (or inter-view) prediction, e.g., relative to the base layer. In particular, video encoder 20 may encode video data of the non-base layer using an extension of the base video coding standard, that is, the base video coding standard to which the base layer conforms. Assuming the base video coding standard is HEVC, the extension may correspond to MV-HEVC, 3D-HEVC, or S-HEVC, in some examples. Of course, video encoder 20 may also encode certain blocks of the non-base layer using intra-prediction and/or intra-layer temporal prediction. For purposes of example, however, it is assumed that video encoder 20 encodes at least some blocks using inter-layer (or inter-view) prediction.

Video encoder 20 may also encode a layer identifier having a value that is not equal to zero in slices of the non-base layer (208). It is assumed, in this example, that a non-zero value for the layer identifier corresponds to a non-base layer (or non-base view, for multiview video coding). However, in cases where a non-base layer may have a zero-valued layer identifier, video encoder 20 may encode the layer identifier to have a value that indicates that the non-base layer is not a base layer.

In addition, video encoder 20 may encode values for the first set of syntax elements and a second set of syntax elements for slices of the non-base layer (210). That is, video encoder 20 may encode values for the set of syntax elements that conform to the base video coding standard, as well as one or more syntax elements conforming to the extension of the base layer video coding standard. For example, video encoder 20 may encode syntax elements conforming to one or more of Tables 1-5, as discussed above. That is, in some examples, video encoder 20 may encode syntax elements indicative of where identifiers for inter-layer (or inter-view) reference pictures are to be positioned within a reference picture list for slices of a non-base layer. The one or more syntax elements conforming to the extension of the base layer video coding standard may be included within any or all of SPSs, PPSs, and/or slice headers for the non-base layer. Video encoder 20 may encode the syntax elements in accordance with the example method of FIG. 4.

In this manner, the method of FIG. 5 represents an example of a method of encoding video data, the method including encoding video data of a current slice in accordance with a base video coding standard when the current slice forms part of a base layer of multi-layer video data, and encoding the video data of the current slice in accordance with an extension to the base video coding standard when the current slice forms part of a non-base layer of the multi-layer video data, encoding a value for a layer identifier in a slice header for the current slice, wherein the value for the layer identifier indicates whether the current slice forms part of the base layer or the non-base layer, and, when the current slice forms part of the non-base layer: encoding a first set of syntax elements in accordance with the base video coding standard, and encoding a second set of one or more syntax elements in accordance with the extension to the base video coding standard.

Figure 6:
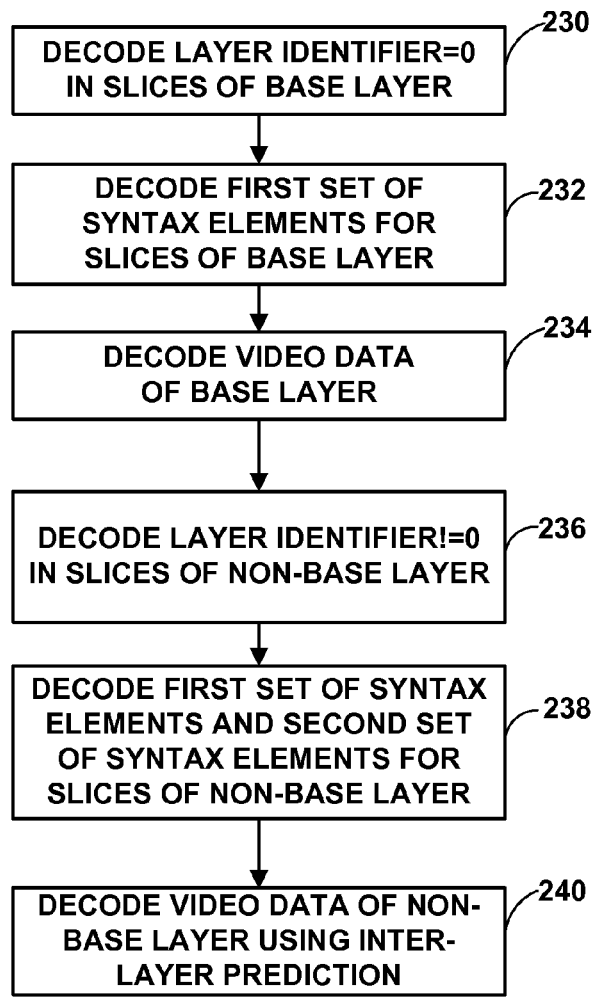
FIG. 6 is a flowchart illustrating an example method of decoding video data in accordance with the techniques of this disclosure.

FIG. 6 is a flowchart illustrating an example method of decoding video data in accordance with the techniques of this disclosure. Although primarily described with respect to video decoder 30 of FIGS. 1 and 3, it should be understood that the method of FIG. 6 may be performed by any video decoding device, e.g., a video decoder or a video transcoder.

Video decoder 30 may receive a slice of a layer, and determine the layer for the slice based on a value of a layer identifier included in a slice header for the slice. In the example of FIG. 6, video decoder 30 first decodes a layer identifier of 0 in a slice of the base layer (230). In particular, video decoder 30 determines that the slice is in the base layer because the layer identifier is equal to zero, in this example. Of course, if a different value for the layer identifier is assigned to the base layer, video decoder 30 may determine that a slice is in the base layer when the layer identifier signaled in the slice header for the slice is equal to that value. Moreover, it should be understood that the layer identifier may correspond to an identifier of a layer in multi-layer coding, which includes view identifiers for multi-view coding.

Based on the determination that the slice is in the base layer, video decoder 30 may decode a first set of syntax elements for slices of the base layer (232). For example, video decoder 30 may decode the syntax elements in accordance with a base video coding standard, such as HEVC. In some examples, this may include selecting a parser that is configured to parse data according to the base video coding standard. For instance, the parser may be configured according to a grammar that includes entries for the first set of syntax elements, without including entries for other syntax elements (e.g., syntax elements of an extension to the base video coding standard). The syntax elements may include, for example, sequence parameter sets (SPSs), picture parameter sets (PPSs), and/or slice headers.

Video decoder 30 may then decode video data of the base layer (234). For example, video decoder 30 may determine whether blocks of the slices of the base layer are intra-coded or inter-coded, and decode the blocks accordingly. Again, in light of the determination that the video data is in the base layer, video decoder 30 may decode the video data using coding tools of the base video coding standard, e.g., HEVC.

Video decoder 30 may then decode layer identifiers having a non-zero value in slices of a non-base layer (236). In particular, after decoding a non-zero value for a layer identifier, video decoder 30 may determine that the layer for the slice is not a base layer. For example, video decoder 30 may determine that the layer is an enhancement layer, for scalable video coding, or a dependent view, for multi-view video coding. Again, this is assuming that a value of zero corresponds to the base layer; in instances where a non-zero value corresponds to the base layer, video decoder 30 may determine that a slice is in a non-base layer when a layer identifier for the slice has a value other than the value corresponding to the base layer.

Based on the determination that the slice is in a non-base layer, video decoder 30 may decode the first set of syntax elements (described above with respect to the base layer) and a second set of syntax elements for slices of the non-base layer (238). The second set of syntax elements may correspond to syntax elements that are particular to an extension of the base video coding standard. That is, the base layer may be coded according to the base video coding standard, whereas non-base layers may be coded according to the extension of the base video coding standard.

Accordingly, video decoder 30 may decode both syntax elements conforming to the base video coding standard (the first set of syntax elements) as well as syntax elements conforming to the extension of the base video coding standard (the second set of syntax elements). Assuming the base video coding standard is HEVC, the extension may correspond to, for example, S-HEVC, MV-HEVC, or 3D-HEVC. As explained above, video decoder 30 may select a parser that is configured according to the extension of the base video coding standard, such that the parser is constructed according to a grammar including entries for the first set of syntax elements and the second set of syntax elements.

Video decoder 30 may then decode video data of the non-base layer using at least some inter-layer prediction (240). Video decoder 30 may decode some of the non-base layer using intra-predictive or intra-layer inter-predictive coding techniques, but it is assumed, in this example, that at least some blocks of the non-base layer are coded using inter-layer prediction. For example, some of the blocks may be coded using inter-view prediction. In this manner, video decoder 30 may use coding tools of the extension to the base video coding standard to decode blocks that are inter-layer predicted.

In accordance with further techniques of this disclosure, the second set of syntax elements may include data indicative of how to decode the inter-layer predicted blocks. For example, the second set of syntax elements may indicate how to construct and/or modify a reference picture list, to include inter-layer (which may include inter-view) reference pictures. Using these syntax elements, video decoder 30 may construct or modify a reference picture list, e.g., as discussed above with respect to FIG. 4.

In this manner, the method of FIG. 6 is an example of a method of decoding video data, the method including decoding a value for a layer identifier in a slice header for a current slice in a current layer of multi-layer video data, and, when the value for the layer identifier is not equal to zero: decoding a first set of syntax elements in accordance with a base video coding standard, and decoding a second set of one or more syntax elements in accordance with an extension to the base video coding standard.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   decoding a first value for a first layer identifier in a first slice header for a first slice in a first layer of multi-layer video data;
   in response to determining that the first value for the first layer identifier is not equal to zero:
      decoding a first set of values for a first set of syntax elements in accordance with a base video coding standard, wherein the first set of values correspond to the first slice; and
      decoding a second set of values for a second set of one or more syntax elements in accordance with an extension to the base video coding standard, wherein the second set of values correspond to the first slice;
   decoding a second value for a second layer identifier in a second slice header for a second slice in a second layer of the multi-layer video data; and
   in response to determining that the second value for the second layer identifier is equal to zero, decoding a third set of values for the first set of syntax elements in accordance with the base video coding standard, wherein the third set of values correspond to the second slice, without decoding any values for the second set of one or more syntax elements corresponding to the second slice.

2. The method of claim 1, wherein the base video coding standard comprises High Efficiency Video Coding (HEVC) base specification.

3. The method of claim 2, wherein the extension comprises one of scalable video coding (S-HEVC), multiview video coding (MV-HEVC), or three-dimensional (3D-HEVC).

4. The method of claim 1, wherein the second set of one or more syntax elements includes a syntax element representative of a position for an identifier of an inter-layer reference picture of a reference layer in a reference picture list, the method further comprising:
   constructing the reference picture list such that the identifier of the inter-layer reference picture is located in the determined position of the reference picture list.

5. The method of claim 4, wherein the inter-layer reference picture comprises an inter-view reference picture, and wherein the reference layer comprises a reference view.

6. The method of claim 1, wherein decoding the first set of values for the first set of syntax elements and decoding the second set of values for the second set of syntax elements comprises decoding the first set of values for the first set of syntax elements and decoding the second set of values for the second set of syntax elements in at least one of the first slice header for the first slice, a picture parameter set (PPS) for a picture including the first slice, and a sequence parameter set (SPS) for a sequence of pictures including the picture including the first slice.

7. A method of encoding video data, the method comprising:
   encoding video data of a first slice in accordance with a base video coding standard, wherein the first slice forms part of a base layer of multi-layer video data;
   encoding video data of a second slice in accordance with an extension to the base video coding standard, wherein the second slice forms part of a non-base layer of the multi-layer video data;
   encoding a first value for a first layer identifier in a first slice header for the first slice, wherein the value for the first layer identifier indicates that the first slice forms part of the base layer;
   in response to the first slice forming part of the base layer:
      encoding a first set of values for a first set of syntax elements in accordance with the base video coding standard, wherein the first set of values corresponds to the first slice;
      preventing encoding of values for a second set of syntax elements in accordance with the extension to the base video coding standard corresponding to the first slice;
   encoding a second value for a second layer identifier in a second slice header for the second slice, wherein the second value for the layer identifier indicates that the second slice forms part of the non-base layer; and
   in response to the second slice forming part of the non-base layer:
      encoding a second set of values for the first set of syntax elements in accordance with the base video coding standard, wherein the second set of values correspond to the second slice; and
      encoding a third set of values for the second set of one or more syntax elements in accordance with the extension to the base video coding standard, wherein the third set of values correspond to the second slice.

8. The method of claim 7, wherein the base video coding standard comprises High Efficiency Video Coding (HEVC) base specification, and wherein the extension comprises one of scalable video coding (S-HEVC), multiview video coding (MV-HEVC), or three-dimensional (3D-HEVC).

9. The method of claim 7, wherein the second set of one or more syntax elements includes a syntax element representative of a position for an identifier of an inter-layer reference picture of a reference layer in a reference picture list, the method further comprising:

constructing the reference picture list such that the identifier of the inter-layer reference picture is located in the determined position of the reference picture list.

10. The method of claim 9, wherein the inter-layer reference picture comprises an inter-view reference picture, and wherein the reference layer comprises a reference view.

11. The method of claim 7, wherein encoding the second set of values for the first set of syntax elements and encoding the third set of values for the second set of syntax elements comprises encoding the second set of values for the first set of syntax elements and encoding the third set of values for the second set of syntax elements in at least one of the second slice header for the second slice, a picture parameter set (PPS) for a picture including the second slice, and a sequence parameter set (SPS) for a sequence of pictures including the picture including the second slice.

12. A device for coding video data, the device comprising:
a memory configured to store multi-layer video data; and
a video coder configured to:
code a first value for a first layer identifier in a first slice header for a first slice in a first layer of the multi-layer video data,
in response to the first value for the first layer identifier being not equal to zero:
code a first set of values for a first set of syntax elements in accordance with a base video coding standard, wherein the first set of values correspond to the first slice, and
code a second set of values for a second set of one or more syntax elements in accordance with an extension to the base video coding standard, wherein the second set of values correspond to the first slice;
code a second value for a second layer identifier in a second slice header for a second slice in a second layer of the multi-layer video data; and
in response to the second value for the second layer identifier being equal to zero:
code a third set of values for the first set of syntax elements in accordance with the base video coding standard, wherein the third set of values correspond to the second slice, without coding any values for the second set of one or more syntax elements corresponding to the second slice.

13. The device of claim 12, wherein the base video coding standard comprises High Efficiency Video Coding (HEVC) base specification, and wherein the extension comprises one of scalable video coding (S-HEVC), multiview video coding (MV-HEVC), or three-dimensional (3D-HEVC).

14. The device of claim 12, wherein the second set of one or more syntax elements includes a syntax element representative of a position for an identifier of an inter-layer reference picture of a reference layer in a reference picture list, and wherein the video coder is further configured to construct the reference picture list such that the identifier of the inter-layer reference picture is located in the determined position of the reference picture list.

15. The device of claim 14, wherein the inter-layer reference picture comprises an inter-view reference picture, and wherein the reference layer comprises a reference view.

16. The device of claim 12, wherein the video coder is configured to code the first set of values for the first set of syntax elements and code the second set of values for the second set of syntax elements in at least one of the first slice header for the first slice, a picture parameter set (PPS) for a picture including the first slice, and a sequence parameter set (SPS) for a sequence of pictures including the picture including the first slice.

17. The device of claim 12, wherein the video coder comprises a video decoder configured to decode the current slice of video data.

18. The device of claim 12, wherein the video coder comprises a video encoder configured to encode the current slice of video data.

19. A device for coding video data, the device comprising:
means for coding a first value for a first layer identifier in a first slice header for a first slice in a first layer of multi-layer video data;
means for coding a first set of values for a first set of syntax elements in accordance with a base video coding standard in response to the first value for the first layer identifier being not equal to zero;
means for coding a second set of values for a second set of one or more syntax elements in accordance with an extension to the base video coding standard in response to the first value for the first layer identifier being not equal to zero;
means for coding a second value for a second layer identifier in a second slice header for a second slice in a second layer of the multi-layer video data; and
means for coding a third set of values for the first set of syntax elements in accordance with the base video coding standard, wherein the third set of values correspond to the second slice, without coding any values for the second set of one or more syntax elements corresponding to the second slice, in response to the second value for the second layer identifier being equal to zero.

20. The device of claim 19, wherein the second set of one or more syntax elements includes a syntax element representative of a position for an identifier of an inter-layer reference picture of a reference layer in a reference picture list, further comprising:
means for constructing the reference picture list such that the identifier of the inter-layer reference picture is located in the determined position of the reference picture list.

21. The device of claim 20, wherein the inter-layer reference picture comprises an inter-view reference picture, and wherein the reference layer comprises a reference view.

22. A non-transitory computer-readable storage medium having stored thereon instructions that, when executed, cause a processor to:
code a first value for a first layer identifier in a first slice header for a first slice in a first layer of multi-layer video data;
in response to the first value for the first layer identifier being not equal to zero:
code a first set of values for a first set of syntax elements in accordance with a base video coding standard, wherein the first set of values correspond to the first slice; and
code a second set of values for a second set of one or more syntax elements in accordance with an extension to the base video coding standard, wherein the second set of values correspond to the first slice;
code a second value for a second layer identifier in a second slice header for a second slice in a second layer of the multi-layer video data; and
in response to the second value for the second layer identifier being equal to zero, code a third set of values for the first set of syntax elements in accordance with the base video coding standard, wherein the third set of values correspond to the second slice, without decoding any values for the second set of one or more syntax elements corresponding to the second slice.

23. The non-transitory computer-readable storage medium of claim 22, wherein the base video coding standard comprises High Efficiency Video Coding (HEVC) base specification, and wherein the extension comprises one of scalable video coding (S-HEVC), multiview video coding (MV-HEVC), or three-dimensional (3D-HEVC).

24. The non-transitory computer-readable storage medium of claim 22, wherein the second set of one or more syntax elements includes a syntax element representative of a position for an identifier of an inter-layer reference picture of a reference layer in a reference picture list, further comprising instructions that cause the processor to:
   construct the reference picture list such that the identifier of the inter-layer reference picture is located in the determined position of the reference picture list.

25. The non-transitory computer-readable storage medium of claim 24, wherein the inter-layer reference picture comprises an inter-view reference picture, and wherein the reference layer comprises a reference view.

\* \* \* \* \*